United States Patent
French et al.

(10) Patent No.: US 6,266,053 B1
(45) Date of Patent: Jul. 24, 2001

(54) TIME INHERITANCE SCENE GRAPH FOR REPRESENTATION OF MEDIA CONTENT

(75) Inventors: Michael T. French, Newburyport; John S. Robotham, Belmont, both of MA (US)

(73) Assignee: SynaPix, Inc., Lowell, MA (US)

( * ) Notice: Subject to any disclaimer, the term of this patent is extended or adjusted under 35 U.S.C. 154(b) by 0 days.

(21) Appl. No.: 09/054,603

(22) Filed: Apr. 3, 1998

(51) Int. Cl.$^7$ ............................................. G06F 15/00
(52) U.S. Cl. .................... 345/302; 345/149; 345/440; 707/501
(58) Field of Search .................... 345/302, 339, 345/440, 149; 707/501

(56) References Cited

U.S. PATENT DOCUMENTS

| | | | |
|---|---|---|---|
| 3,947,833 | 3/1976 | Eckstein, Jr. | 340/258 R |
| 3,970,841 | 7/1976 | Green | 250/201 |
| 4,175,860 | 11/1979 | Bacus | 356/39 |

(List continued on next page.)

FOREIGN PATENT DOCUMENTS

| | | |
|---|---|---|
| 0 612 027 A2 | 8/1994 | (EP) . |
| 93/21636 | 10/1993 | (WO) . |
| 96/31979 | 10/1996 | (WO) . |

OTHER PUBLICATIONS

Döllner, J., et al., "Object–oriented 3D Modelling, Animation and Interaction," *The Journal of Visualization And Computer Animation*, vol. 8, pp. 33–64 (1997), XP–002081716.

(List continued on next page.)

*Primary Examiner*—Heather R. Herndon
*Assistant Examiner*—Cong-Lac Huynh
(74) *Attorney, Agent, or Firm*—Hamilton, Brook, Smith & Reynolds, P.C.

(57) ABSTRACT

A technique for representing a visual scene as a directed acyclic graph of data and operators that generates a sequence of image frames over specified time intervals. The graph specifies temporal and spatial values for associated visual elements of the scene. Time is modeled in the inheritance properties explicitly defined within the scene graph hierarchy, by assigning temporal attributes to each media element. Branch nodes of the graph specify transforms for the temporal and spatial coordinate systems. To evaluate the appearance or behavior of the scene and in particular the global time values of particular elements at a given time instant, the graph is traversed in a direction from a root node down toward the leaf nodes, thereby causing temporal transformations specified along the branches of the graph to modify time parameters of the scene data at the nodes. Child nodes are preferably evaluated after being transformed, to determine the extent to which they contribute the data to the final scene. Temporal transformations may include translation operations that offset temporal event times; scaling operations that change the rate at which time passes; or clipping operations, that restrict the range of time parameters to exclude the evaluation of parts of the graph.

19 Claims, 13 Drawing Sheets

U.S. PATENT DOCUMENTS

| | | | |
|---|---|---|---|
| 4,385,322 | 5/1983 | Hubach et al. | 358/221 |
| 4,620,318 | 10/1986 | Hill | 382/2 |
| 4,639,768 | 1/1987 | Ueno et al. | 358/22 |
| 4,646,229 | 2/1987 | Boyle | 364/200 |
| 4,661,986 | 4/1987 | Adelson | 382/41 |
| 4,667,221 | 5/1987 | Cawley et al. | 358/22 |
| 4,682,300 | 7/1987 | Seto et al. | 364/571 |
| 4,685,146 | 8/1987 | Fenster et al. | 382/54 |
| 4,692,806 | 9/1987 | Anderson et al. | 358/209 |
| 4,703,514 | 10/1987 | van der Wal | 382/41 |
| 4,706,296 | 11/1987 | Pedotti et al. | 382/42 |
| 4,835,532 | 5/1989 | Fant | 340/728 |
| 4,847,688 | 7/1989 | Nishimura et al. | 358/125 |
| 4,849,746 | 7/1989 | Dubner | 340/728 |
| 4,858,000 | 8/1989 | Lu | 358/84 |
| 4,864,394 | 9/1989 | Gillard | 358/105 |
| 4,870,692 | 9/1989 | Zuiderveld et al. | 382/6 |
| 5,058,042 | 10/1991 | Hanna et al. | 364/522 |
| 5,063,603 | 11/1991 | Burt | 382/37 |
| 5,067,014 | 11/1991 | Bergen et al. | 358/105 |
| 5,133,070 | 7/1992 | Barker et al. | 395/650 |
| 5,134,473 | 7/1992 | Nagura | 358/109 |
| 5,140,416 | 8/1992 | Tinkler | 358/88 |
| 5,210,799 | 5/1993 | Rao | 382/22 |
| 5,212,544 | 5/1993 | Kellar et al. | 358/22 |
| 5,259,040 | 11/1993 | Hanna | 382/41 |
| 5,260,791 | 11/1993 | Lubin | 358/160 |
| 5,270,756 | 12/1993 | Busenburg | 358/109 |
| 5,296,926 | 3/1994 | Nagura | 348/144 |
| 5,307,456 | 4/1994 | MacKay | 395/154 |
| 5,325,449 | 6/1994 | Burt et al. | 382/56 |
| 5,355,450 | 10/1994 | Garmon et al. | 395/162 |
| 5,414,806 | 5/1995 | Richards | 395/135 |
| 5,455,775 | 10/1995 | Huber et al. | 364/488 |
| 5,473,364 | 12/1995 | Burt | 348/47 |
| 5,488,674 | 1/1996 | Burt et al. | 382/284 |
| 5,511,153 | 4/1996 | Azarbayejani et al. | 395/119 |
| 5,515,487 * | 5/1996 | Beaudet et al. | 345/440 |
| 5,568,602 * | 10/1996 | Callahan et al. | 345/302 |
| 5,577,190 | 11/1996 | Peters | 395/501 |
| 5,588,104 | 12/1996 | Lanier et al. | 395/326 |
| 5,588,139 | 12/1996 | Lanier et al. | 395/500 |
| 5,596,687 | 1/1997 | Peters, Jr. | 395/130 |
| 5,615,325 * | 3/1997 | Peden | 395/326 |
| 5,619,628 | 4/1997 | Fujita et al. | 395/127 |
| 5,668,988 * | 9/1997 | Chen et al. | 707/101 |
| 5,708,767 | 1/1998 | Yeo et al. | 395/140 |
| 5,729,673 * | 3/1998 | Cooper et al. | 345/427 |
| 5,758,093 * | 5/1998 | Boezeman et al. | 709/249 |
| 5,806,056 * | 9/1998 | Hekmatpour | 706/50 |
| 5,808,625 | 9/1998 | Picott et al. | 345/440 |
| 5,852,684 * | 12/1998 | Lopresti et al. | 382/309 |
| 5,861,880 * | 1/1999 | Shimizu et al. | 345/302 |
| 5,861,885 * | 1/1999 | Strasnick et al. | 345/335 |
| 5,870,768 * | 2/1999 | Hekmatpour | 707/501 |
| 5,892,507 * | 4/1999 | Moorby | 345/302 |
| 5,963,948 * | 10/1999 | Shilcrat | 707/100 |
| 5,970,496 * | 10/1999 | Katzenberger | 707/102 |
| 5,995,958 * | 11/1999 | Xu | 707/3 |
| 6,014,143 * | 1/2000 | Naqvi et al. | 345/424 |

OTHER PUBLICATIONS

Kalra, D., et al., "Modeling with Time and Events in Computer Animation," *Eurographics '92,* vol. 11, No. 3, pp. C–45 through C–58, XP–002111065.

Beier, E., "Issues on Hierarchical Graphical Scenes," Technical University of Ilmenau, Department of Computer Graphics, XP–002111066.

Poelman, C.J., "The Paraperspective and Projective Factorization Methods for Recovering Shape and Motion," Carnegie Mellon School of Computer Science, (Jul. 1995).

Becker, S., et al., "Semiautomatic 3–D Model Extraction From Uncalibrated 2–D Camera Views," MIT Media Laboratory.

Sawhney, H.S., "3D Geometry From Planar Parallax," Machine Vision Group—IBM Almaden Research Center, (1994).

Ballard, D.H., et al., "An Approach to Knowledge–Directed Image Analysis," Computer Vision Systems, (1978).

Burt, P.J. et al., "The Laplacian Pyramid as a Compact Image Code," *IEEE Transactions on Communications,* COM–31(4):532–540, (Apr. 1983).

Williams, T.W. et al., "Model–Building in The Visions System," Massachusetts Institute of Technology $5^{th}$ International Joint Conference on Artificial Intelligence, 2:644–645, (Aug. 1977).

Jancene, P. et al., "RES: Computing the Interactions Between Real and Virtual Objects in Video Sequences."

Rohrer, R., "Automated Construction of Virtual Worlds Using Modeling Constraints," The George Washington University—Progress Report, (Jan. 1994).

Debevec, P.E., et al., "Modeling and Rendering Architecture from Photographs: A Hybrid Geometry–and Image–Based Approach," Computer Graphics Proceedings, Annual Conference Series, 11–20, (1996).

Debevec, P.E., et al., "Recovering High Dynamic Range Radiance Maps from Photographs," Computer Graphics Proceedings, Annual Conference Series, 369–378, (1997).

Alzarbayejani, A., et al., "Recursive Estimation of Motion, Structure, and Focal Length," *IEEE Transactions on Pattern Analysis and Machine Intelligence,* 17(6):562–575, (Jun. 1995).

Berthold, K.P.H., et al. "Determining Optical Flow," *Artificial Intelligence,* 17:185–203, (1981).

Brooks, R.A., et al. "Geometric Modeling in Vision for Manufacturing," *SPIE,* 281:141–159, (1981).

Fua, P., "Model–Based Optimization: An Approach to Fast, Accurate, and Consistent Site Modeling from Imagery," Artificial Intelligence Center—SRI International.

Fua, P., et al. "Using 3–Dimensional Meshes to Combine Image–Based and Geometry–Based Constraints," SRI International.

Tomasi, C., et al., "Shape and Motion from Image Streams: a Factorization Method—Planar Motion," Carnegie Mellon School of Computer Science, (Sep. 1990).

Tomasi, C., et al., "Shape and Motion from Image Streams: a Factorization Method—Point Features in 3D Motion," Carnegie Mellon School of Computer Science, (Jan. 1991).

Tomasi, C., "Shape and Motion from Image Streams: a Factorization Method," Carnegie Mellon School of Computer Science, (Sep. 1991).

Little, T.D.C., et al., "Interval–Based Conceptual Models for Time–Dependent Multimedia Data," Boston University Multimedia Communications Laboratory and Purdue University School of Electrical Engineering Multimedia Communications Lab, (May 1993).

Schechter, G., et al., "Functional 3D Graphics in C++ —with an Object–Oriented, Multiple Dispatching Implementation," Eurographics Object–Oriented Graphics Workshop, (1994).

Elliott, C., "The Essence of ActiveX Animation," Microsoft Research, (Feb. 1997).

Elliott, C., "A Brief Introduction to Active VRML," Microsoft Research Technical Report, (Feb. 1996).

Maestri, G., "Parametric, Object–Oriented Modeling and Animation with Houdini," pp. 48–50, *Digital Magic,* (Aug. 1997).

Drazovich, R.J., et al., "Radar Target Classification," pp. 496–501, *IEEE,* (Aug. 1981).

Levine, M.D. et al., "A Knowledge–Based Computer Vision System," pp. 335–352, Computer Vision Systems, (1978).

State, A. et al., "Superior Augmented Reality Registration by Integrating Landmark and Magnetic Tracking," pp. 429–438, Computer Graphics Proceedings, Annual Conference Series, (1996).

"Middlesex Virtual Set System," Product Brochure, (1997).

"Cyberset O Highland Virtual Set," Product Orad High–Tec Systems, (1997).

"Virtual Replay Sports Analysis Tool," Product Brochure, (1997).

"Jaleo Digital Post Production System," Product Brochure, (1997).

"Flint and Flint RT," Product Brochure, (Mar. 1997).

"Warner Digital Creates Glacial Gales," *American Cinematographer,* pp. 38–39, (Jul. 1997).

"Digiscore Saves the Day," Product Flyer, (1996).

"Inferno," http://www.discreet.com, (1997).

"Flame," Product Description, http://www.discreet.com, (1997).

"Composer V4," Alias Wave Front Product Description, (1995).

"Power Animator," Alias/Wavefront Product Brochure, (1996).

"SoftImage 3D 3.51 for Windows," Product Review, (1995).

"3D Studio Max," Product Review, (1997).

"Animation Master," Product Demonstration, (1997).

Clarkson, M., "3D Animation Tools for Less Than $1,500," *PC Graphics and Video,* pp. 52–56, (Aug. 1996).

Hamlin, J.S., "Autodessys' 3D Modeler FormZ Renderzone 2.8," *PC Graphics and Video,* pp. 58–62, (Aug. 1996).

Street, R., "3–D Software for the Newcomer," *A V Video,* pp. 62–67, (Jul. 1996).

Sowizral, H., et al., "Java 3D API Specification," (Aug. 1997).

Tenenbaum, J.M., et al., "IGS: A Paradigm for Integrating Image Segmentation and Interpretation," Artificial Intelligence Center—Stanford Research Institute, pp. 504–513.

Binford, T.O., et al., "Image Understanding Via Geometric Models," pp. 364–369, *IEEE,* (1980).

Price, K.E., et al., "Symbolic Matching of Images and Scene Models," pp. 105–112, *IEEE,* (1982).

Amini, A.A., et al., "Representation and Organization of Domain Knowledge in a Blackboard Architecture: A Case Study from Computer Vision," pp. 884–889, *IEEE,* (1987).

Feldman, J.A., et al., "Decision Theory and Artificial Intelligence—A Semantics–Based Region Analyzer," *Artificial Intelligence,* 5:349–371, (1974).

Barrow, H.G., et al., "Representation and Use of Knowledge in Vision," Stanford Research Institute.

Nevatia, R., et al., "Description and Recognition of Curved Objects," *Artificial Intelligence,* 8:77–98, (1977).

Parma, C.C., et al., "Experiments in Schema–Driven Interpretation of a Natural Scene," pp. 237–245, *IEEE* (1980).

Hanson, A.R., et al., "Constructing Semantic Models in the Visual Analysis of Scenes," The Milwaukee Symposium on Automatic Computation and Control, pp. 97–102.

Shaheen, S.I. et al., "Some Experiments with the Interpretation Strategy of a Modular Computer Vision System," *Pattern Recognition,* 14(1–6): 87–100, (1981).

Levine, M.D., et al., "A Modular Computer Vision System for Picture Segmentation and Interpretation," *IEEE Transactions on Pattern Analysis and Machine Intelligence,* PAMI—3(5):540–556, (Sep. 1981).

Levine, M.D., et al., "A Modular Computer Vision System for Picture Segmentation and Interpretation," pp. 522–539, *IEEE,* (1979).

"Nonlinear Video Reigns at NAB," *NewMedia,* pp. 21–29, (Jun. 1996).

Beale, S., "Media Components Come Together," www.macworld.com, pp. 56–57, (Nov. 1996).

Gagalowicz, A., "Collaboration Between Computer Graphics and Computer Vision," Proceedings of the Third International Conference on Computer Vision, Osaka, Japan, pp. 733–737 (Dec. 4–7, 1990).

Menon, J., "Collaborative Visualization and Modeling," Proceedings of the 1997 International Conference on Shape Modeling and Applications, Aizu–Wakamatsu, Japan, pp. 178–187 (Mar. 3–6, 1997).

* cited by examiner

Operator module

Operator macro

Live scene macro 60

Load shape macro

TIME INHERITANCE SCENE GRAPH FOR REPRESENTATION OF MEDIA CONTENT

BACKGROUND

Computer-based systems are increasingly used for critical roles in the production (including the post production phase of the overall production process) of motion pictures, television programs and commercials, multimedia presentations, interactive games, internet content, CD-ROMs, DVDs, and simulation environments used for entertainment, training, education, marketing and visualization. Each of these applications may use multimedia data and image processing techniques to some degree to create and/or render a computer model of a scene in a real or synthetic world. The scene model not only describes buildings, parts, people, props, backgrounds, actors, and other objects in a scene, but also represents relationships between objects such as their movement, interactions, and other transformations over time.

Having a three-dimensional representation of the scene can be quite useful in most phases of multimedia production, including choreography, rendering and compositing. For example, consider a motion picture environment where computer-generated special effects are to appear in a scene with real world objects and actors. The producer may benefit greatly by creating a model from digitized motion picture film using automated image-interpretation techniques and then proceeding to combine computer-generated abstract elements with the elements derived from image-interpretation in a visually and aesthetically pleasing way.

There are presently two general categories of techniques for representing a scene model. The oldest technique focuses on embedding an implied scene model within a programmatic construction that integrates the elements of the media production. Traditionally, display list systems were used to create visual representations of such models. The design of these systems was therefore driven largely by the capabilities of the display list type graphics hardware that existed approximately ten to twenty years ago.

In this approach there is no conceptually distinct representation of the scene model. Instead, one or more sequential imperative programs explicitly manage implementation chores which control the operation and visual presentation of the scene on a digital computer display. These implementation chores may include sampling of media such as film or video in time, emulation of force and other interactions, and frame generation. With this approach to scene modeling, every program needs to re-implement its presentation of the scene geometry, usually at the level of line and pixel drawing operations, each time that the conceptual model of the scene changes.

More recent advances in object-oriented data-processing have been applied to graphics systems to greatly simplify the way in which scene models may be conceptualized. Higher level representation systems such as PHIGS, Open Inventor, VRML, ActiveX, and Java 3D have resulted in a paradigm shift away from specifying how to present a scene to specifying the scene model itself. This object-oriented scene model paradigm provides a number of important advantages. For example, model specifications, rather than becoming programs for rendering images and sounds, simply become descriptions of the objects in the scene and their properties and dynamic behaviors. These types of systems can be used to construct models in a natural way because the end-users can think in terms of abstract or real world objects, and therefore need not have the expertise nor even the interest in traditional graphics or real-time programming. Such models also tend to be more robust since they do not tend to exhibit side effects that interfere in subtle ways with the effects of other components, while providing other advantages such as economies of scale, usefulness, and longevity as well as automatic level of detail management.

These techniques allow the creation of media content to be as natural as possible, since they are based on a simple and intuitively familiar view of the world; that is, as a hybrid of continuous variations and discrete events as applied to particular objects. Using such object-oriented modeling systems, one creates media productions without the need to "program" the underlying mechanisms for interpreting the scene model and its dynamics at each frame. Rather, the author simply describes a geometric or other abstract model for an object. A bouncing red ball is, for example, represented as a data structure defining an object with a spherical shape and a color parameter of red, together with a specification for its movement over time.

These models also easily support the importation, aggregation, and texture mapping of objects and images, as well as change in their attributes such as color and position, as well as representations of cameras, lights and sounds. Spatial two-dimensional (2-D) and three-dimensional (3-D) transforms such as translation, scaling, rotation, and other linear and non-linear transforms may also be applied in an orderly way.

Dynamics in the model and their effects are described as time varying functions and events, freeing the author from the programming mechanics of simulating the dynamics, checking for events and causing the effects to happen. For media content of extremely high or subtle accuracy, the author is also typically freed from implementation issues such as multithreading the simulation with the rendering or compositing tasks.

These modeling systems exploit several key ideas that give object-oriented techniques their inherent power. For example, complex models may be built from modular, simpler building blocks. By applying composition attributes repeatedly, complex models can be constructed, while each layer of the description remains tangible. Parameterization also allows families of related model elements to be defined in terms of parameters to be specified at a later time.

The specification and authoring framework for an object-oriented modeling system can be a programming language, a graph structure, or some combination of the two. In a language-based system, the scene model is expressed in terms of a programming language designed specifically for generation of media content. ActiveX Animation™ (a trademark of Microsoft Corporation) is an example of a language based scene modeling system.

A language like ActiveX can have considerable expressive power for defining complex behaviors, including expressing the inheritance of context between procedural functions. Such a language can also express time-based or event-based behaviors. But the author of the media content is required to work within a programming language to define the scene's objects, their relationships and dynamics.

In a graph-oriented modeling system, such as the VRML 2.0 standard, the scene model is specified in terms of creating and manipulating a data structure. This data structure is represented as nodes in a graph and the connections between them. A graph-oriented modeling system also defines the semantics of traversals over the graph structure. The traversal is done by one or more external components, with at least one traversal mechanism providing the means to generate media content from the scene model. Graph-oriented scene models have seen widespread adoption as a natural way of expressing the structure and relationships between components of a scene model.

The nodes within the graph structure can be object-oriented modules that encapsulate both data and procedural functions. Directed connections can express concepts such as spatial context inheritance and data dependencies between nodes.

Increasingly, authors of media content are expected to integrate production of various media types such as film, video, computer animations, audio, text, and other attributes in a variety of application environments. Even with such object-oriented paradigms, the construction of integrated scene models consisting of a myriad of objects originating from multiple media source types remains notoriously difficult, for a number of reasons. For example, many of these elements are heavily time dependent, such as the audio and video in a motion picture, requiring carefully orchestrated time ordered sequencing during presentation. Synchronization is important in several aspects, including the play out of concurrent or sequential streams of data, simulating dynamic behavior, as well as responding to external events generated by a human user of a modeling system, including the browsing, querying, and editing typical of stored data applications. The task of coordinating the sequences of these multimedia data is critical to the quality of the overall result.

These timing relationships can be implied in some instances, such as in the simultaneous acquisition of a voice and an imagery track from video camera sequence. In other instances, they must be explicitly formulated such as in the case of a computer animation piece. In either situation, the characteristics of each medium, and relationships among them, must be carefully established to provide proper synchronization.

In most graph-oriented scene modeling systems, time is not expressed in terms of the graph structure. Instead, a time context is specified in a way which is external to the graph structure. Time-based or event-based behaviors are therefore either assumed to be part of the traversal engine, or are encoded within nodes that interact through mechanisms which exist outside of the graph structure.

SUMMARY OF THE INVENTION

In its most general form, the present invention is a technique for representing a time varying visual scene as a directed acyclic graph of data and operators that generates a sequence of image frames over specified time intervals. Each node in the graph represents an object oriented functional module that inherits a temporal as well as a spatial context, accepts and/or generates parameters, and processes some aspect of the scene. Directed data paths in the graph represent the flow of context, data (including media data) and/or control parameters as the graph is traversed from one node to another.

Elements of a scene are processed within the nodes of the graph. The nodes may process media data, such as images, video sequences, 3-D geometry, audio, or other data representative of the media elements. The nodes may also specify or modify control values or parameters for media elements. For example, the nodes may specify temporal and spatial values for the associated elements.

The graph has one or more root nodes, which define the beginning of directed paths through the graph, one or more leaf nodes, which define the end of a path, and any number of branch or intermediate nodes disposed along a path from a root node to a leaf node.

One novel aspect of the scene graph lies in the notion that time is modeled in the inheritance properties explicitly defined within the scene graph hierarchy. To summarize the core idea, the present invention assigns a temporal context to each node in the graph. All media nodes and node parameter values have a temporal extent, which may be zero, finite or infinite, and an implicit or explicit temporal behavior. The temporal context can be modified by each node, including transforming the time context into a local time coordinate system. The temporal context, with any local modifications, is inherited by successive nodes along a path. Different local temporal coordinate systems may therefore be nested within an inherited time context of parent and child nodes.

Branch and leaf nodes of the graph can specify transforms for the temporal coordinate system, and, optionally, spatial coordinate system transforms. The branch nodes may also have grouping semantics which implicitly transform time and/or clipping semantics that cull the traversal of the graph. For example, temporal clipping may be specified which explicitly culls the traversal of a path in the scene graph based upon time parameter values.

To evaluate the appearance or behavior of the scene and in particular the time-based values of particular elements at a given time instant, the graph is traversed in a direction from a root node down toward the leaf nodes. The root node specifies an initial temporal context with a time scale and time interval associated with the overall choreographed media production.

Forward traversals of the graph, that is, continuing in a direction from a root node towards a leaf node, cause temporal transformations as specified along the branches of the graph to modify time parameters of the data at the child nodes. Child nodes are preferably evaluated after the transform is applied, to determine the extent to which they contribute the data to the final scene. Any temporal clipping results in excluding the node from contributing to the scene based upon an allowed range of time values for which the node is valid.

The branch nodes may apply temporal transformations of various types. These may include (1) translation operations that shift the time or origin to offset temporal event times; (2) scaling operations that change the rate at which time passes, which in turn shifts the frequencies of critical behaviors such as a change in the velocity of moving objects; (3) clipping operations, that restrict the range of time parameters to exclude the evaluation of parts of the graph outside a specified time window; or (4) data analysis operations, that generate time parameters based on analyzing time-dependent data within the current time context.

Other branch nodes may apply implicit or explicit temporal operations to be performed upon groups of the child nodes in special ways. For example, a sequence-type branch node may specify a temporal ordered grouping for instances of its children such that the second child is translated by the temporal extent of the first child and so on. This means that either exactly none or exactly one of the referenced children is evaluated at any given scene time based upon the inherited time value, the temporal extent of the children, and their ordered grouping.

The invention can also be used to specify the media production as a graph of nodes and acyclic directed paths that define symmetric sets of both forward and reverse traversals of the graph. In this instance, the scene graph represents a two-phase process. In the first phase, the forward traversal, the temporal context is inherited from the root node along each path and temporal transforms are applied at every node where they are specified. The second phase, the reverse traversal, starts at the leaf nodes. The processing related to generating the media content is performed at each node, within the local temporal context established during the corresponding forward traversal. In the reverse traversal, any number of parameters, data elements, or pointers to data elements can be "passed back" along the reverse path.

A spatial context can also be carried with the temporal context, with spatial transforms being applied and used in a manner similar to the temporal transforms during the forward and reverse traversals. The spatial context can either be a 2-D or 3-D context. Nodes in the graph may also represent rendering processes for the spatial transforms that, for example, transform a 3-D spatial context into 2-D spatial context, to generate visual image frames from a 3-D scene model.

An image analysis process may also be represented in the graph with a spatial transform to transform a 2-D spatial context into a 3-D spatial context based upon parameters from the analysis of at least two image frames to recover 3-D data from the visual scene represented by the image frames.

To evaluate the model, such as for example, to render a representation of the scene, a forward traversal of the graph is initiated at a root node, and continuing through branch nodes as described above. The temporal transform within a given node can terminate further forward traversals of the graph, and initiate a reverse traversal of the graph, based upon the transform of one of the parameters of the input time context evaluating to a null value. When all paths have returned to the root node at the end of the reverse traversals, all of the data and parameters required for the specified rendering will have been processed. In this scenario, the root node can be thought of as being a viewer for some segment of the production, or of an object in the scene. Different root nodes can thus specify different contexts for viewing the same scene.

While the structure of the scene graph specifies a set of rules and procedures for generating time-based media content, the actual implementation of traversals can perform various optimizations, provided these optimizations yield the same overall result as a traversal executed exactly as specified. For example, a pipeline implementation might perform the equivalent of multiple traversals over a segment of a path, by dividing the time interval of a time context into multiple sub-intervals. A traversal implementation may also implement a caching scheme which allows a cache of pre-processed data to substitute for some or all of the processing normally done during a reverse traversal of a path.

Also, an initial setup traversal might be performed, in order to pre-fetch data associated with a time context, for improved performance during a reverse traversal.

Finally, a forward traversal can carry within the temporal context one or more constraint parameters which can modify processing during the reverse traversal in order to meet the specified constraint. For example, a constraint can be specified for image quality, sound quality, level-of-detail or constraints on processing time (including real-time processing constraints).

The graph structure can be presented and/or manipulated in a user interface as a schematic diagram with nodes represented as shapes and connections between nodes as lines or arcs. Time transforms and time extents associated with graph nodes can also be presented and/or manipulated in a user interface as a time line with nodes represented as tracks and associated time transform and time extents represented as time intervals on these tracks.

Although previous scene graph systems have incorporated mixed media, including images, video, geometry and audio, and while these other systems also have specified inheritance properties for attributes and data such as spatial transforms, they have not typically specified temporal behaviors. Even when such systems have included temporal behavior specifications, these are provided as external connections, outside the scene hierarchy, and without any notion of temporal inheritance.

The ability to integrate a time context and time inheritance into a graph oriented scene modeling system brings a new level of capability into the familiar graph oriented scene modeling paradigm. In particular, it allows the author of the media content to express temporal transforms as well as spatial transforms within the graph structure. It also explicitly defines the inheritance of a temporal context through a traversal mechanism. This is done without requiring the adoption or learning of a new programming language.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

1. Introduction

Figure 1:
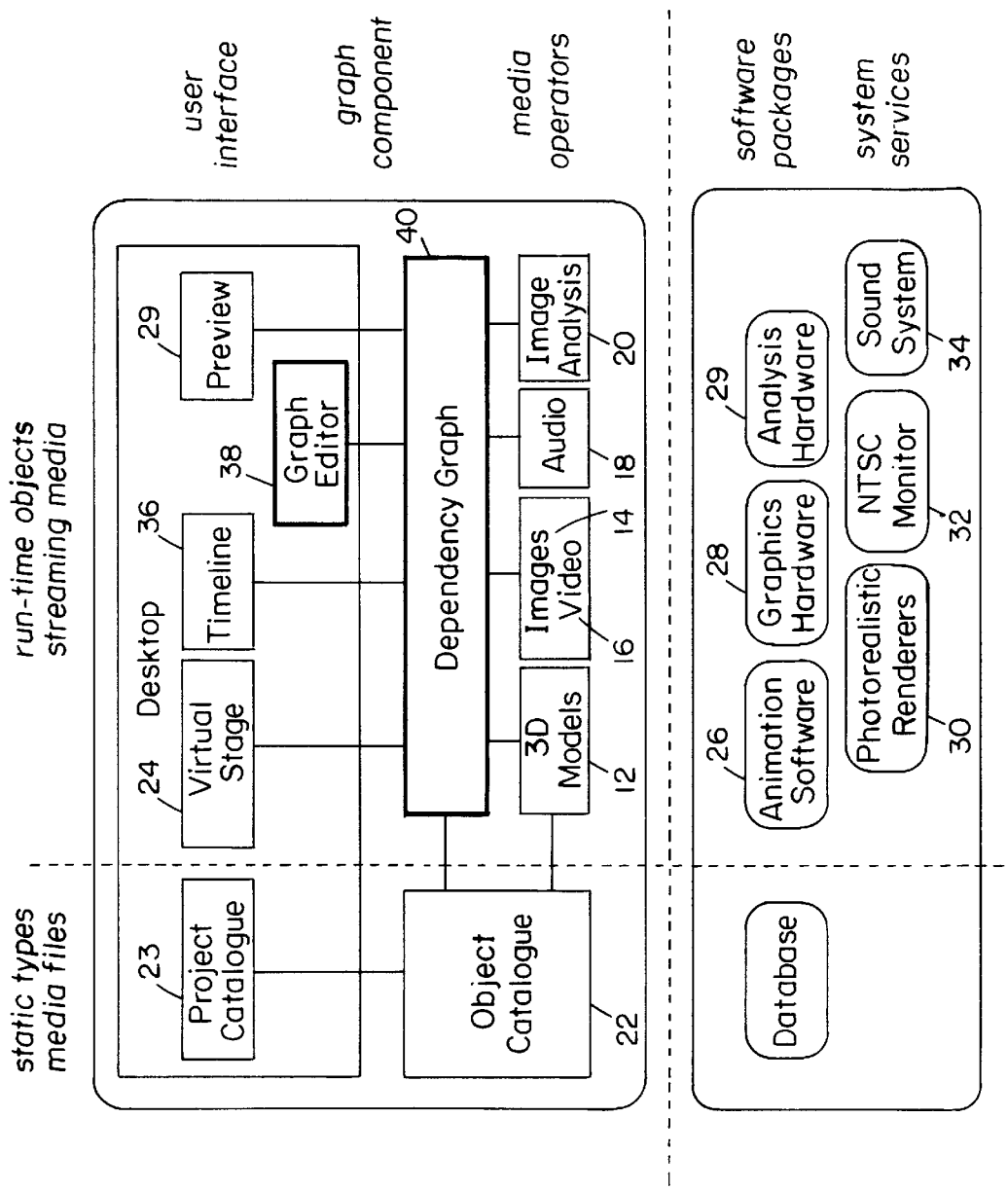
FIG. 1 is a block diagram of a multimedia production system which uses a scene graph according to the invention.

Turning attention now to the drawings more particularly, FIG. 1 is a block diagram of a multi-media production system 10 in which a scene graph according to the invention may be implemented. The system 10 includes a number of media data object representations such as 3-D models 12, images 14, video 16, and audio 18, as well as the output from processes which operate on such data, such as image analysis 20 operations. Each of these data objects represents some aspect of the scene.

For example, the 3-D models 12 may be imported from computer animation systems; the images 14 and video 16 may be provided by film and/or video cameras; and the audio data 18 may be provided by audio systems. Image analysis 20 functions operate on the images and video and/or rendered 3-D models 12 to provide analytic representations of the other elements of the scene. For example, one process 20 may analyze video clips of a scene to determine a depth map indicating the positions of objects in the scene relative to a reference point, such as a camera location.

The system 10 provides object-oriented representations for the scene in the form of an object catalog 22 and project catalog 23. Objects are defined with reference to a virtual stage 24 that represents the three-dimensional spatial characteristics of the scene. Other software packages and system services may include animation software 26, graphics hardware 28, analysis hardware 29, photo-realistic renderers 30, and output devices such as video monitors 32, and sound system hardware 34.

A timeline 36 specification and preview window 39 permit the user to specify a time extent and viewpoint for a particular rendition of the dependency or scene graph 40.

For a more thorough description of a preferred technique for representing various multimedia data types and further details of preferred object modeling and image analysis techniques, please refer to a co-pending U.S. patent application entitled "Adaptive Modeling and Segmentation of Visual Image Streams", filed Oct. 10, 1997 and assigned to Synapix, Inc., the assignee of the present invention, which is hereby incorporated by reference.

Figure 2:
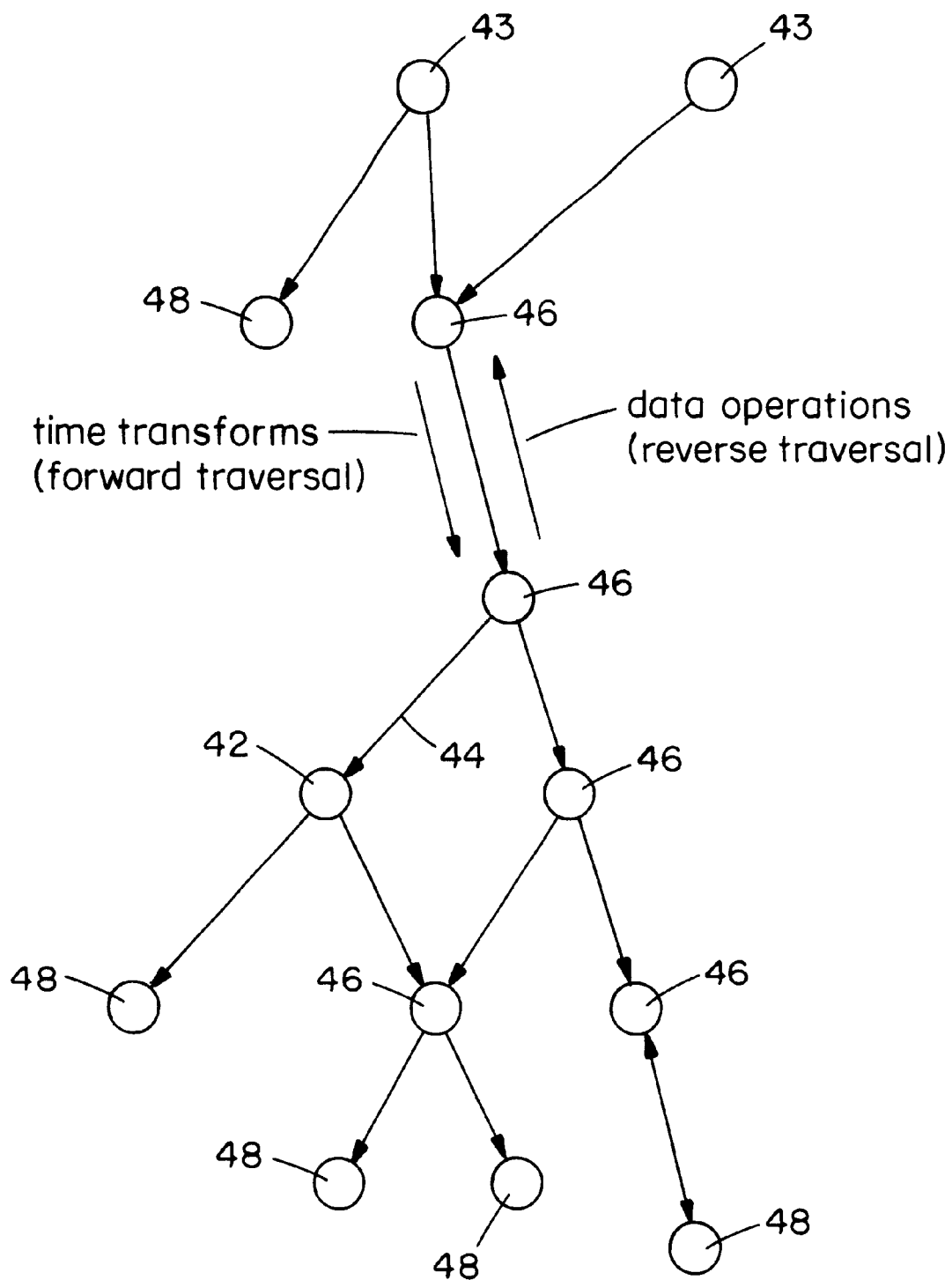
FIG. 2 is a canonical representation of a scene graph according to the invention.

Turning attention now to the specifics of the present invention, a graph editor 38 enables the user to create and manipulate a data structure referred to as the dependency or scene graph 40. In general, as shown in FIG. 2, the scene graph 40 consists of a set of nodes (of which one is shown generically as node 42) which are linked together in a special form of hierarchy, known as a directed acyclic graph (or "DAG"). The connections 44 between nodes 42 are directed, in the sense that they imply an asymmetric parent-child relationship. The graph is acyclic because the connections are not allowed to form a loop, which means child nodes cannot have links to their ancestors or themselves.

As with other hierarchical data structures, nodes which have ancestors and children are referred to herein as branch or intermediate nodes 46, and nodes without children are called leaf nodes 48. Nodes with no ancestors are known as root nodes 43. The directed acyclic graph may have one or more root nodes 43.

The parent-child relationship serves to define inherited characteristics. For example, the characteristics of a parent node are inherited by the children 46 and their descendants, but characteristics of the children do not affect a parent node. Such characteristics may include the general attributes such as color, or the temporal transformations described more fully herein below. Since there can be multiple paths that pass through a single node in the graph 40, every unique path through the graph 40 defines its own inheritance relationships.

The scene graph 40 represents the internal state of the scene created by the user. Nodes in the graph 40 are operators 50 on multimedia data, or containers 52 for references to such multimedia data stored elsewhere in the system 10.

As will be explained more fully below, a temporal context is associated with nodes 46. Traversals of the scene graph 40 in a forward direction, that is, from a parent node 43 toward a leaf node 48, may cause temporal transformations as specified by branch nodes 46 to modify the temporal properties of the objects in the scene. Reverse traversals of the scene graph 40 apply other data-related operations to the objects needed to render the scene.

Figure 3A:
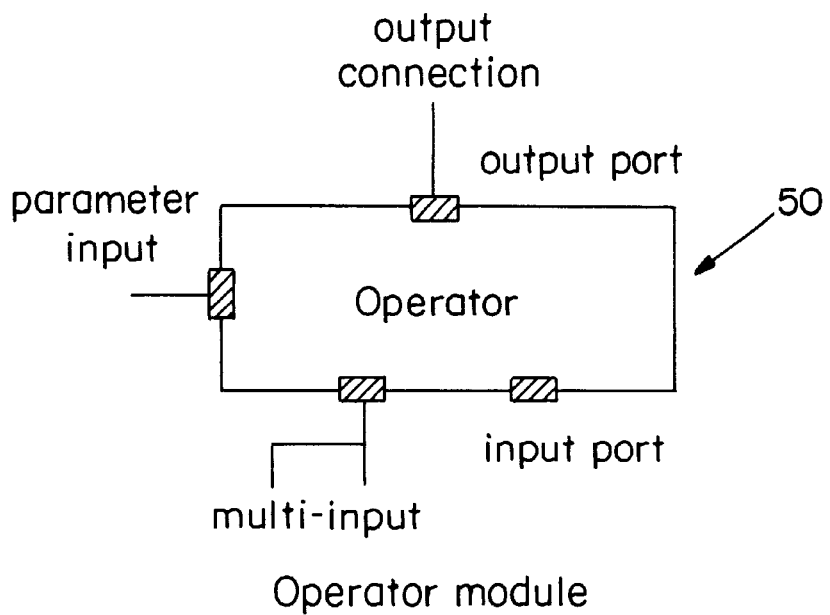
FIGS. 3A and 3B illustrate an operator node and macro operator, respectively.
Figure 3B:
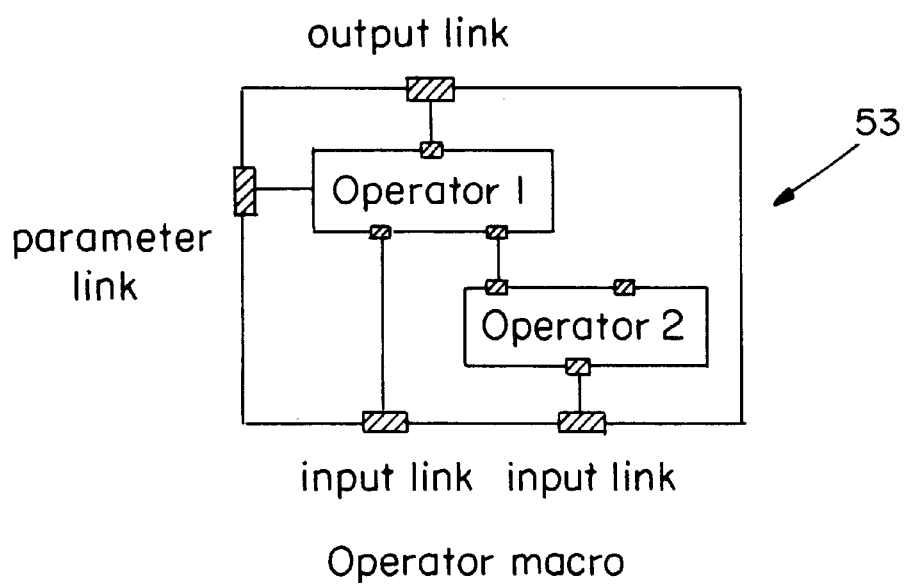

Operators 50, as shown in FIG. 3A, have typed input ports, output ports, and parameters to control the processing of data. A set of operators and connections can be grouped into a macro operator 53. Input and output ports are exported across the macro boundary through explicit macro links. Other internal ports are inaccessible and the data is encapsulated. Parameters for the macro are explicitly chosen from the parameters available on the enclosed operators. A library of common macros can be provided, some of these being compiled (or "cooked") into individual non-editable system objects, and some of those may represent hardware accelerated pipelines.

Connections 44 or arcs of the graph 40 are typed directed data pathways between operator ports. Connections 44 establish bidirectional dependencies between the operator nodes. Ports either allow single connections, or multiple connections between nodes.

Events are passed across the connections to notify operators 50 of data changes. Data is passed by reference whenever possible. A scheduler determines which operators 50 fire, and in which sequence, to correctly update dependent data. An operator 50 with changes on several of its data inputs, or multiple changes to a single input, only fires once.

There is no high-level distinction required between data processing operators 50 which modify data values, and data structural operators, which merely modify, wrap or contain data references.

Parameter values for the operators 50 have input and output ports. Parameters can, for example, take animated input from function curves, or (explicitly or implicitly) from user interface elements. Parameter outputs can connect to operators for processing, chain to other operator parameters, or (perhaps implicitly) to user interface elements for echoing. The default parameter connections are a bidirectional get/set relationship with the operator's 50 property sheet user interface.

2. Example: Dinosaur Shadows Demo Scene

Figure 4:
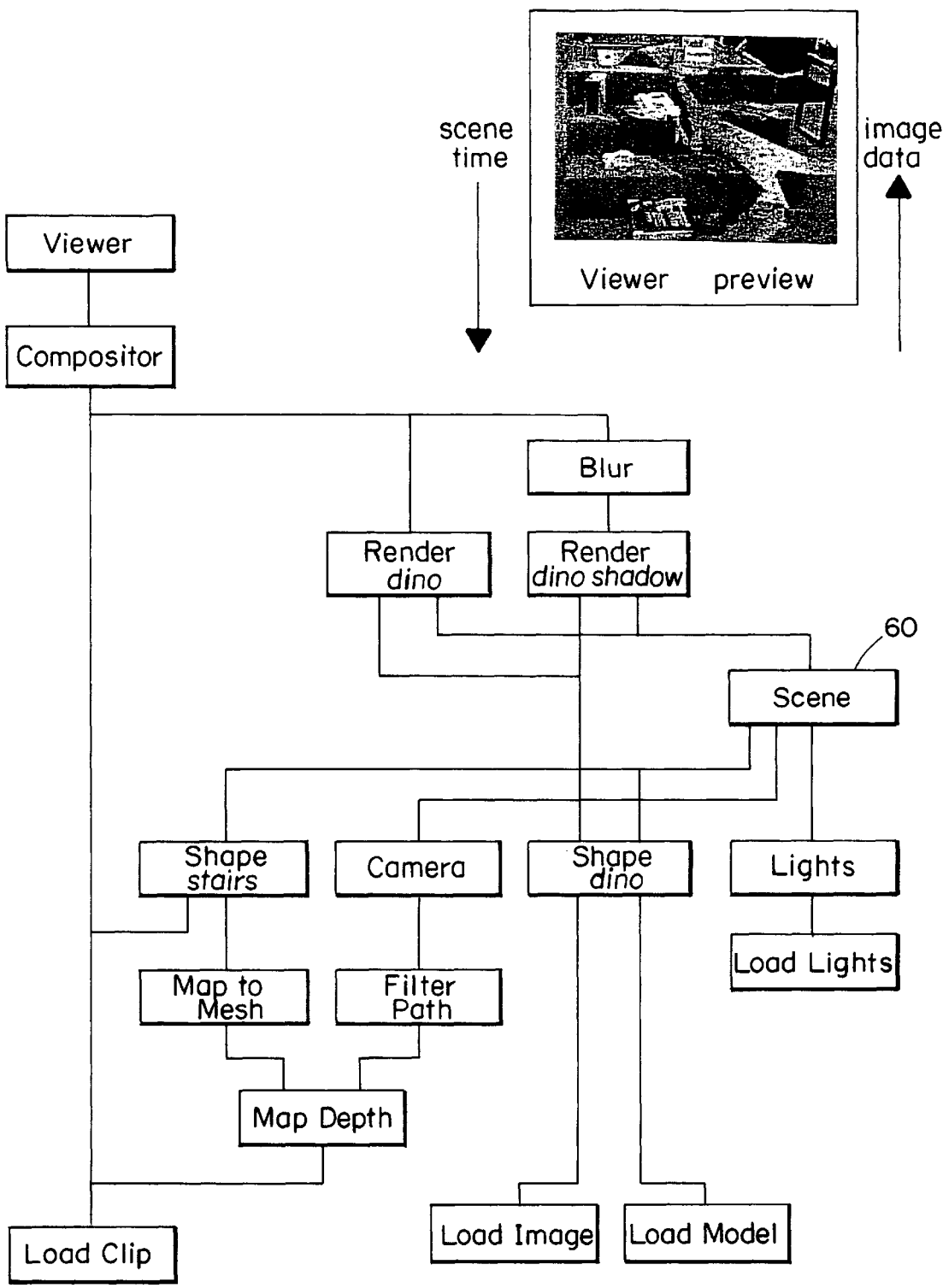
FIG. 4 is an exemplary scene graph for a scene in which a computer animated dinosaur is walking through live scene shot with a video camera.

The example scene graph 40 shown in FIG. 4 represents a demonstration scene of a computer animated dinosaur 60 walking into a live scene such as an office environment and which therefore must cast a shadow on a set of stairs 62. The scene graph 40 includes simplified networks of operators 50 including render passes, scenes, geometries and image analysis. The underlying regions are the domains for image compositing, 3D scenes, and shader spaces which generate texture images.

Figure 5A:
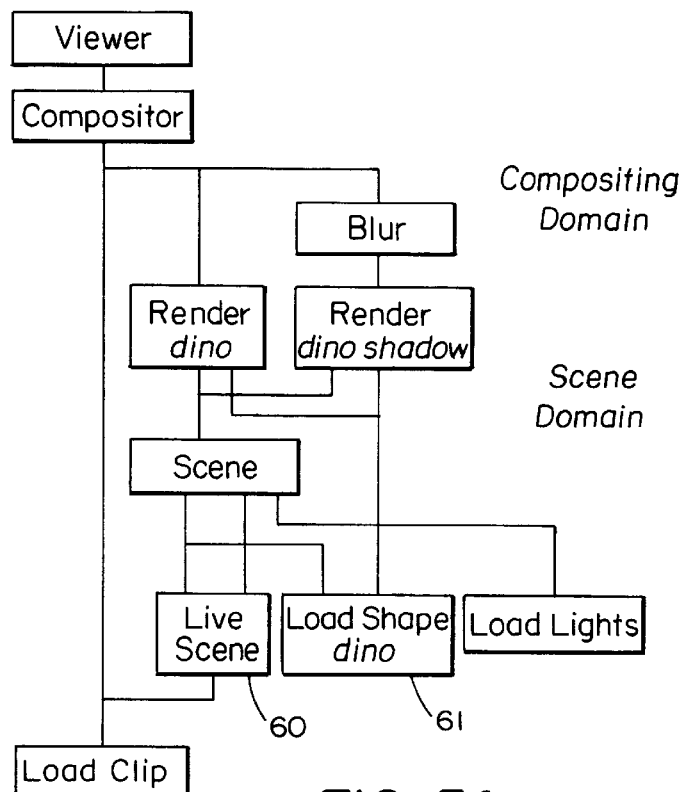
FIGS. 5A and 5B are more detailed views of the scene graph.
Figure 5B:
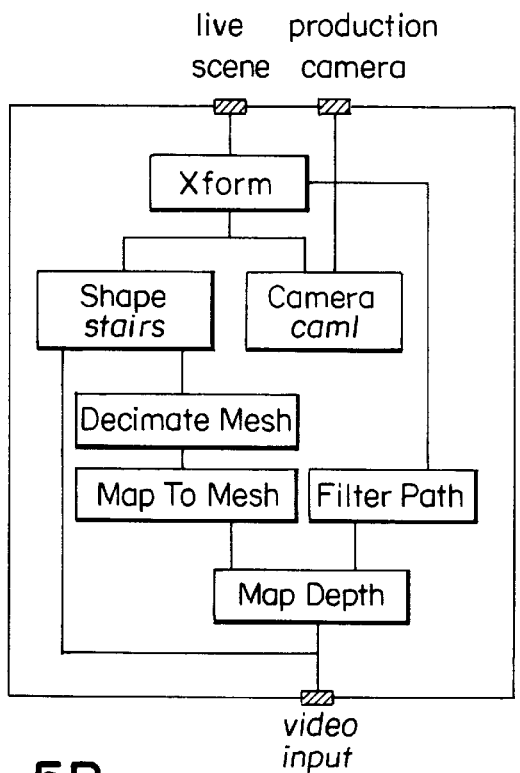
Figure 6A:
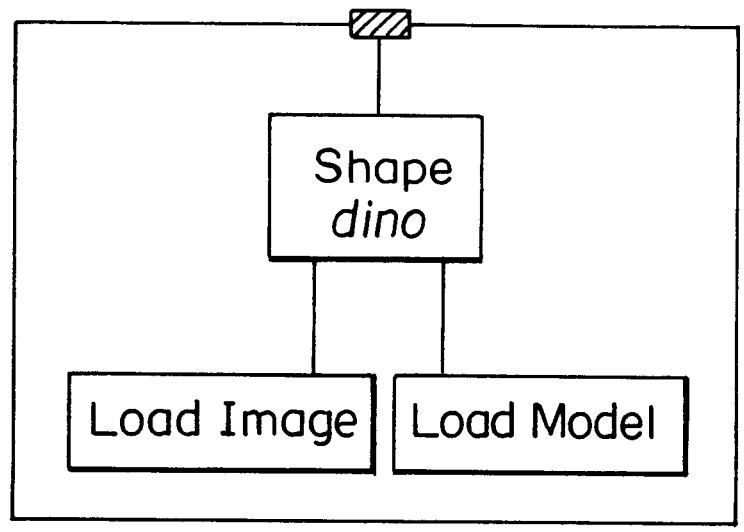
FIG. 6A is a view of a load shape macro operator in the scene graph.

As shown in FIG. 5A, operators such as the live scene 60 and the dinosaur model loader 61 are pushed down into macros (FIGS. 5B and 6A). The nominal convention is that input parameters appear on the left of the module, but a transform node Xform parameter input is shown on the right of the module for convenience of layout. Also the Render and Scene operators 50 have references to the LoadShape macro 61 for the dinosaur actually attach to a common output port.

FIG. 5B is an expanded view of the LiveScene macro 60, where it is assumed that cameras have default position and orientation, which can be modified by transformations. The connection labeled "production camera" is the camera reference for the scene. The macro 60 also assumes that a MapToMesh operator produces a depth map or mesh geometry in camera coordinates, which in turn determines the connections to the common transform node.

3. Graph Execution

An operator 50 within the scene graph 40 represents a class in the underlying computational code. Some structural classes are naturally arranged in a hierarchy, and it makes sense to talk of an operator's inherited type. Usually this will correspond to the output type of the operator. Containment of other objects within the class usually means read-only references to input objects used by the operator.

An operator 50 is made available to the graph 40 by turning the computational operator into a graph component, or module. The modules seen by the graph 40 are really just containers which hold the computational operator (amongst other things). The modules are not typed in the same sense as the underlying operators, they are simply components of the graph model. Only a graph manager process needs to know how to manipulate the module components. The modules and their execution model comprise a harness for the raw operator code.

The graph 40 is serialized by serializing the modules and the connections. Each module and each port has a unique name within the graph. The state of the graph 40 is captured by serializing module parameter values, including media references in loader modules. The complete internal state of the graph can be recreated by loading the graph and the parameter values. Activity is journalled by capturing a graph state, then serializing events which pass between modules. These are the types of serializable objects:

Serializable

Graph (contains modules and connections)

Module (contains type name, instance name, input ports, output ports, parameters, operator function)

Port (contains type name, instance name, in/out/param flag, single/multi flag, connection (list), visible/export flag)

Connection (contains name, type, source port, destination port)

Event (contains type, connection name, event data)

Multiple inputs are provided to the processing function in an ordered list. The result of operator 50 may be order-dependent (e.g. a layered composite). Connection order provides a default ordering for the input list, but the multi-input port will provide a reordering tool to change the sequence without reconnecting.

a. Events

Operators 50 communicate using events channeled through connections and delivered at ports. These are the main types of events:

Event connection events (receiver) input/output connect input/output disconnect port changed events (receive on input, send to output) temporal extent changed spatial extent changed data changed If parameters are distinguished from inputs/outputs, then additional events are required (input/output parameter dis/connect, parameter temporal extent changed, parameter data changed).

If output traversals are event-driven (see below), then a traversal context changed event must be added to the graph.

It is possible to include a complete hierarchy of data changed events, which specialize the type of data being changed.

The events are not necessarily independent, and it may be necessary to design an event implementation which does result in single updates for multiple related changes to input data, perhaps using event masks through a single event notification. For example, making a connection may be accompanied by a data changed event.

Data is passed by reference. Passing the data reference from producer to consumer occurs when a connection is made, and/or when a data changed event is delivered. The exact behavior depends on the permanence of the data structure (and perhaps the memory allocation model of where the data is stored). If data has to be fetched explicitly, perhaps with a handshake to synchronize processing, then fetch data, fetch temporal extent, fetch spatial extent events may be added.

Not all these high-level events will be passed directly to the encapsulated processing function. The high-level operator wrapper will filter, modify and dispatch events to the relevant internal routines (cache, extent, data function).

b. Traversals

Returning attention to FIG. 2 briefly, the scene graph 40 can be traversed by visiting each node 42 in a particular order, via connections in the graph. Traversals are used for inquiries and generating output. The scene graph uses a depth-first traversal: for each node visited, a pre-order action is invoked, the downstream connections are recursively traversed, then the node visit is completed with a post-order action. Traversal state is maintained in a traversal context. The context can be inquired and modified by traversal actions within the nodes. The traversal context contains information such as the current time for the scene, and the renderer being used to display output.

There are two ways to implement traversals of the graph. The first approach is to consider a conventional explicit depth-first traversal of the DAG. The pre-order operation modifies the traversal context, for instance, by transforming the global time to the local time for the node. The post-order operation updates the output data for the node by processing the new data made available on its input ports during recursive traversal.

Traversal of a group operator has the basic form:
traverse( TimeContext ctx ) { pre( ctx )

children.traverse( ctx )

post( ctx )

}

For example, a time translation modifying the current local time is:

```
pre( TimeContext ctx ) {
  ctx.pushTimeStack()
  ctx.addTime( -paramDeltaT )
}
post( TimeContext ctx ) {
  ctx.popTimeStack()
}
```

Procedural traversals are typically dispatched through nodes to renderers, but this can be generalized to a triple dispatch for actions over renderers and nodes. The triple dispatching makes it relatively easy to create new traversals, localize renderer-independent traversal state within the action, and isolate renderer-specific operations. The order of dispatching ultimately affects whether the final implementation resides within renderers or nodes, which in turns affects the ease with which renderers and nodes can be added to the system.

Traversal of individual children can proceed in independent threads, if there are no shared nodes further down the graph, or the shared nodes do not retain state. The second approach is to consider how a traversal could be implemented using an event-driven execution model. Traversals of the graph 40 are initiated by an external change to a traversal context which is referenced from a root 43 of the graph 40. Changes to the traversal context are propagated through the graph 40, with further changes made within each node 42 (like the explicit pre-order functions). When the traversal context reaches the leaf nodes 48 of the graph 40, new data may be generated, and a second wave of changes propagates back up the graph 40, modifying data (like post-order functions). The event driven traversal depends on bidirectional notification along connections. For example, the time translation operator modifies a changed context, but passes through any changed data. The single traverse procedure has been replaced with two independent event callbacks, which rely on the scheduler to propagate the updates in order.

```
ctxChanged( TimeContext & ctx ), {
  ctx.addTime( -paramDeltaT )
}
dataChanged( Data * data ) {
  setDataChanged( data )
}
```

The setDataChanged method is a no-op, which doesn't change the data pointer, but is enough to propagate the dataChanged event to dependent data connections.

It is preferred that the way to decompose execution is to have event driven dependencies, which mark data as dirty and invalidate caches, but retain procedural synchronous traversal actions for the fast generation of output data. The synchronous traversal can use multiple threads for parallel processing of independent branches, or shared branches which do not retain state.

There are several types of event or traversal propagation:
  connection events propagate changed extents, up towards the root
  changed data propagates changed extents and invalidates caches, towards the root
  output traversals propagate temporal context, down toward the leaves
  output traversals propagate recalculated data, up toward the root.
c. Renderers and Domains A renderer class defines an abstract Application Programming Interface (API) for nodes to call during traversal, and node actions are dispatched to renderer implementations. Caches are part of the renderer interface. By abstracting actions and caches, every node implementation is made renderer independent. Renderers must maintain a cache factory to construct the correct cache type.

Traversals occur within domains. When a render traversal reaches a domain boundary, it must either find a data cache in the appropriate form, or it must pause and fire a new render traversal into the neighboring domain, to build the required data. The type of the new renderer must match the new domain, but the specific instanced renderer may be supplied by the boundary node.

These are the two choices for domain processing: schedule domains to be traversed, from leaf domain to root domain, ensuring all data is made available to cached nodes; or have one universal traversal which chains out of scene-level caches through callbacks, and into new domain traversals.

There may be some compromise combination of these alternatives, where domains are processed independently, but simple loader domains, which don't do any processing, can be compiled into a cached scene graph. For example, loading an image into a material seems like a trivial domain, which is better serviced by a callback from the cached material node. A more complex load/process/material pipeline can be promoted to full domain status.

The domains are
  2D imaging and compositing
  3D segmentation and compositing
  3D scenes
  2D shader trees and texturing Each traversal has one renderer registered in its traversal context for each domain. This allows a large set of possible renderer functions to be partitioned, with a mix and match selection. There is a close correspondence between data types within the graph 40, the allowable traversals, the set of renderers for each traversal, and the operator nodes 50 which can be processed. These are the principal abstract classes together with some possible output rendering systems:

| Data | Domain | Renderers |
| --- | --- | --- |
| Temporal | Timeline | SW (java UI) |
| Image | 2D imaging | sw, VSA hw, OpenGL, SGI IL/IFL, Java2D |
|  | 3D imaging | sw, OpenGL |
| Renderable | 3D scene | Optimizer/Cosmo, OpenGL, Java3D mental ray, RenderMan, Softimage, Alias |
| Audible | 3D sound | sw, Java3D |
|  | Audio | SGI AL, MIDI, JavaSound |

The highest level type in the system is Temporal, which relates to the handling of scene time within the hierarchy. Every operator and every data structure in the graph can respond to a time-based traversal of the graph.

The time domain includes the whole graph. The time aspects of the graph 40 are rendered to the timeline 36. Image renderables include 2D images and 2D geometric markup. 2D image renderers can process 3D images, but they will only get the correct result when the scene is strictly layered, which may require extra 2D work. 3D scenes can only be represented in a 2D output after being processed by a suitable projection:
  3D scene to 2D image: Render operator
  3D scene to 3D image: Render operator 3D renderables obviously include 3D shapes, but can also include images and 2D markup if they are embedded in the correct coordinate system within the 3D world.

If Images are just containers, objects must be matched by content with introspection, rather than statically typed by class. If Images are distinguished, then the Render operator should also be distinguished. This would make things a lot cleaner, at the expense of losing flexibility and polymorphism.

There are several fundamental converters for the 2D to 3D boundary.

2D image to 3D image: depth extraction 3D image to 3D scene: map to mesh 2D image to 3D scene: texturing Some macros, such as ImageObject, wrap the texturing boundary and appear to convert 2D images to 3D renderables.

There are two stages to the traversal and processing of Audible data. First a 3D sound must be spatialized, attentuated, and pitch adjusted. Then conventional 2D channels are balanced, filtered and mixed. An audio renderer can process 3D sounds, but the sounds will not be spatialized correctly, so the 3D processing has to be added by hand in the mixing domain. The boundary between 3D sound and audio domains is the Microphone operator.

d. Caching and Extents

Caches truncate traversal of the scene graph 40. Data can be cached in any node 42, but the most important locations for data caches will be the boundary between 2D and 3D domains, video output from imaging pipelines, and within 3D systems. There are two fundamental types of cache:

Extents
  Only enough information to decide whether to traverse the node, such as spatial and temporal bounds of the data.
Data
  Explicitly holds all the data needed to replace a traversal of the node.

An extent is renderer-independent, and there is only one for each node. Temporal extents are scene time independent. The spatial extent has an associated temporal variation, since spatial extents can be evaluated instantaneously for one frame, or accumulated over time for an envelope of the object during a scene. An instantaneous spatial extent can use bounding spheres (easy, fast, very conservative), axis-aligned bounding boxes, or object-aligned bounding boxes. Extended envelopes may be required for advanced spatial querying, such as collisions and visibility analysis.

Render parameters can also truncate traversal. If a sub-tree is not visible, and not involved in shadows or reflections, then it cannot make any contribution to the output rendering, and need not be traversed. This may mean that a RenderParams cache should also be maintained in every renderable node.

Data caches are renderer-dependent, with each node having an array of caches, one for each renderer. Each cache will contains a reference back to its relevant renderer. Data caches have temporal extents which will be some sub-set of the total temporal extent of the node. There may be frame caches for a particular instant, or extended cached clips, which have a finite duration.

The basic traversal decision made at each node 42 is:
intersect cached extents with current scene extents traverse node ? {
  is there a valid data cache for this renderer ? {
    render from cache
  else {
    traverse node and children
  }
}

Data is passed by reference along connections of the graph, when the nodes share an address space. A reference to unmodified data can be passed through an operator. When an operator creates new data, the data is managed locally within a node, and references made available to the output connections. A change to data in one node potentially invalidates all the caches for its downstream operators, although it is possible to restrict the data updates with masks to be more selective in destroying good caches. It is also possible for scene-level caches (subsidiary scene graphs 40) to manage data changes locally, and not need to propagate the change, or invalidate any caches. The decision to propagate data-changed events should depend on how each renderer handles local cache update. If the system cannot hold all the intermediate data, at each node, even for a single frame, then the data references used by the downstream operators must be explicitly released when they have finished accessing the data. If they hand on the reference, then it is released by downstream operators. This transient data model could be a user option to minimize memory usage on low-RAM machines and for projects with very large graphs, or very large data (e.g. high film resolutions).

If the system can hold all the data for a single frame, then operators can maintain data from frame to frame, and only fire if the data needs to be recalculated. This does ensure some temporal coherence for playback, but will not be very useful for random access, where most data will be changing.

The next level for caching is for storing sets of independent frames in a sequence on disk. This is always done for audio, which does not have a simple concept of a frame, but is also relevant for video and geometry. Caching clips helps sequential playback, and random access, as long as the random scene time is within the extents specified for the cache. So there can be two explicit cache-building traversals: prepare to play, and prepare for a random access scrub, although most renderers will treat these the same.

Another mode for building the cache is incremental during playback, which is often best when the user knows there will be multiple replays of the same sequence, but wants to see the sequence being built, so that it can be interrupted if something is wrong. The cache is opened in append mode, then each frame is displayed and cached in sequence, finally the cache is closed and the sequence can be replayed at full speed. Not all renderers or media types will support incremental caching. Caches can also be built implicitly by the system, but automatic management can be difficult in the general case of mixed playing and scrubbing.

Caching within 3D and 2D scene graphs will be renderer dependent. There may be scene-level or renderer-level caches. Most 3D graphics systems, including OpenGL, Optimizer and RenderMan, implement operators, such as materials and transforms, as state changes, rather than data processing. They also have hierarchical caches that operate by reference. This means that caches need not be invalidated when the operators change—the update can be applied to the local cache without any changes to other parts of the cached hierarchy.

A summary of data caching strategies in external systems is as follows:
scene level (hierarchical)
cached nodes recursively reference other cached nodes
  node data cached by value
    editable (e.g. regular Optimizer, VRML, mr 2.0)

non-editable (e.g. regular OpenGL)
node data cached by reference
   (e.g. Optimizer/OpenGL vertex arrays)
data level (flat)
cached nodes contain copied data, nodes cannot reference other nodes (e.g. RenderMan)
none (e.g. mr 1.0, every frame must be explicitly described)

The system may or may not choose to implement spatial extents and spatial culling. Some systems have spatial culling which can be enabled independently of the scene graph, and culling for photo-realistic renderers may be an important optimization, but is not crucial for the visual appearance of the finished shot. Advanced spatial querying and the associated computational geometry utilities are also optional.

4. Data Types a. Temporal Variation

All data and parameters can have an animated temporal variation. Traversal contexts also have a temporal content. The only exceptions are: the time parameter itself; graph objects (modules, ports, connections); and absolute media references, such as database connection and element reference. This means that most of the data within the scene graph may have temporal behaviour, but the two fundamental temporal data sources are function curves and media data. These are the base types related to time:

Serializable
   Time (continuous real value, seconds)
   Duration (difference between two times, seconds)
   TemporalExtent
   TemporalConstant (no additional fields)
   TemporalInstant (contains Time field)
   TemporalInterval (contains start Time, end Time)
   FrameRate (number of frames per second)

A constant has no time variation, the value is the same for all times, and there are no additional temporal fields. An instant is a snapshot frame of data at a particular time. An extent dataset is extended or animated over time.

The base class for temporal variation is:
Serializable
   Temporal (contains TemporalExtent)

There are a number of aggregation and container types relevant to temporal datasets:
Serializable
   Frame (Instant, with data value)
   SplitFrame (Instant, with 2 data values)
   KeyFrames (Extent, sequence of Frames)
   Flipbook (Extent, FrameRate, sequence of data values)

A Frame is a data component tagged with an Instant time value. A SplitFrame is a double data component, with entering and leaving values, together with a single time Instant.

Key frames comprise a discrete irregular sequence of frames, ordered such that time is monotonically increasing. Discontinuities can be modeled by using split-frames, rather than two frames which occur at the same time. The high-level manipulation of key-frames is encapsulated in a function curve object. The time extent of the key frames can be set independently from the times within the frames. If the extent goes beyond the extreme frames, then the data is extrapolated. If the extent is within the frame times, then the data is clipped in time.

A flipbook is a discrete regular ordered sequence of data with implicit time. A frame rate is specified which allows the calculation of the total number of data items, and the time value for each individual frame. The extent of a flipbook cannot go beyond the duration implied by the frame rate and number of frames. There is no frame data extrapolation.

Key frames can be regular in time and sufficiently fine grained that they behave like a flipbook. But this representation is not the same as a flipbook, because flipbook data values have implicit times, but key frames have an explicit time value for each frame in the sequence. There are also important differences in playback efficiency for the two types.

A flipbook can be converted to keyframes without loss of information. Keyframes are converted to a flipbook by iteratively sampling an interpolator on the keyframes, for a series of time values calculated from the time interval and a frame rate. The construction and conversion of these containers form the basis for several temporal data operators.

Most raw media sequences will have the local time origin at 0.0, such that the duration is the same as the end time value.

Temporal extents can be implemented as an interval with duration determining the type: −ve (constant), 0 (instant), +ve (extent), or as a form of the State pattern with a sub-class for each type.

b. Data Summary

Operator parameter types overlap the categories for operator input/output data, although it may be helpful to have different visual metaphors for media-centric data flow and simple parametric controls. Base types include:
Temporal
   boolean
   enumerated choices
   integer number
   string name
   real value
      normalized component (0-1)
      angle Actual parameter structures will also include bounded ranges and default values. There will also be aggregate and container data structures which can be used for data or parameters. Real and integral types may be represented in various physical machine types. Fundamental aggregate types include:
Temporal
   color (various components and color spaces)
   point, vector, control vertex (various dimensions)
   rotation, quaternion
   matrix (various dimensions)

These can be further aggregated into arrays:
Temporal
   color channels (colors)
   alpha channel (transparencies/coverages)
   depth map channel (coordinates)
   vector channels (space vectors)

Vector channels are used for normals, motion, displacement and bump maps.

Transformation components expose ports for forward and inverse versions. Affine transforms don't need to store the inverse, since it is trivial to generate from the translate, rotate, scale values. Perspective transforms should always compute and store the inverse matrix with the forward version. There will be aggregates of these types, and stacks for attribute state and transforms.

There are several obvious parameter blocks, which are really collections of simple parameters, but which make sense as data types:

Temporal
  material parameters
    (color, opacity, lighting. coefficients, textures)
  render parameters
    (visibility, shadow flags, reflection flags)
  camera parameters
    (aperture, shutter speed, pixel aspect, lens)
  light parameters
    (color, intensity, shadow flag, shader etc.)
  audio params
    (track tag, volume, balance, attenuation etc.)

Material parameters and light parameters are really just special cases of generalized shader parameters. Shaders are named procedural functions defined for specific renderers. Shaders are declared with a parameter list. Each renderer has a type system for defining shader parameters. Each shader parameter has a name, a type and a default value. A named shader is invoked with a list of arguments for none, some, or all of the shader's parameters. This kind of calling convention may also be useful for other interfaces in the system, including the plug-in interface exposed.

name (string label, integer tag id )
  parameter type (enumeration of available types )
  parameter (name, default/min/max values )
  function declaration (function name,list of parameters)
  argument (parameter name, Temporal argument value )
  function invocation (function name,list of arguments )

There are animation system and object catalog data types.
  database connection
  model reference (scene, model, fcurve, geometry, material, etc.)

The principal media-based data types within the system include:
Temporal
  Image media (2D/3D combination of channels)
  Video media (sequence of images)
  Audio media (tracks, mono/stereo/quad groups)
  Geometry (2D/3D: points, paths, markup, surfaces, vertex data, etc.)

3D scenes are built from renderable data structures. These are data container operators which have references to other renderables, or model data (appearance, geometry etc.):
Temporal
  Renderable (including group, transform and shape)
  Scene (DAG of renderables)

Aggregate types can be used to express temporal variation through a function curve (described above):
  FCurve 5. Operator Types Media data flows from data sources (readers, loaders, animation bridges), is processed by data operators, passes unchanged through temporal operators, and is consumed by data sinks (writers, savers, viewers, animation bridges).

The current time is managed by a temporal context within a traversal context. A temporal traversal propagates the current time in the opposite direction to media data flow: from time sources (data sinks), processed by temporal operators, passes unchanged through data operators, and is consumed by time sinks (data sources).

A pipeline is a chained sequence of unary operators.

Figure 6B:
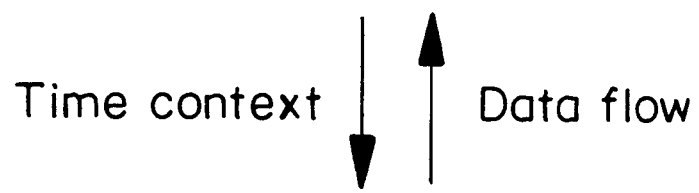
FIG. 6B illustrates that when the scene graph is traversed in one direction, it is evaluated for temporal context, and when traversed in a reverse direction, for data flow.

The convention adopted for graphical representation and evaluation of the graph 40, is that media data flows from bottom to top, and temporal data from top to bottom, as shown in FIG. 6B. There is no distinction between data pathways and parameter pathways, except that media types are not valid parameter types, and cannot have a property sheet user interface. For the detailed discussion of operator types, the single bidirectional connections are broken down into temporal and data flows.

There may not be a direct implementation of these flows within the scene graph, or a direct representation of these flows in the user interface, but they are useful as a conceptual model to aid the understanding of the architectural task, and perhaps for the user to understand system operation.

Figure 12:
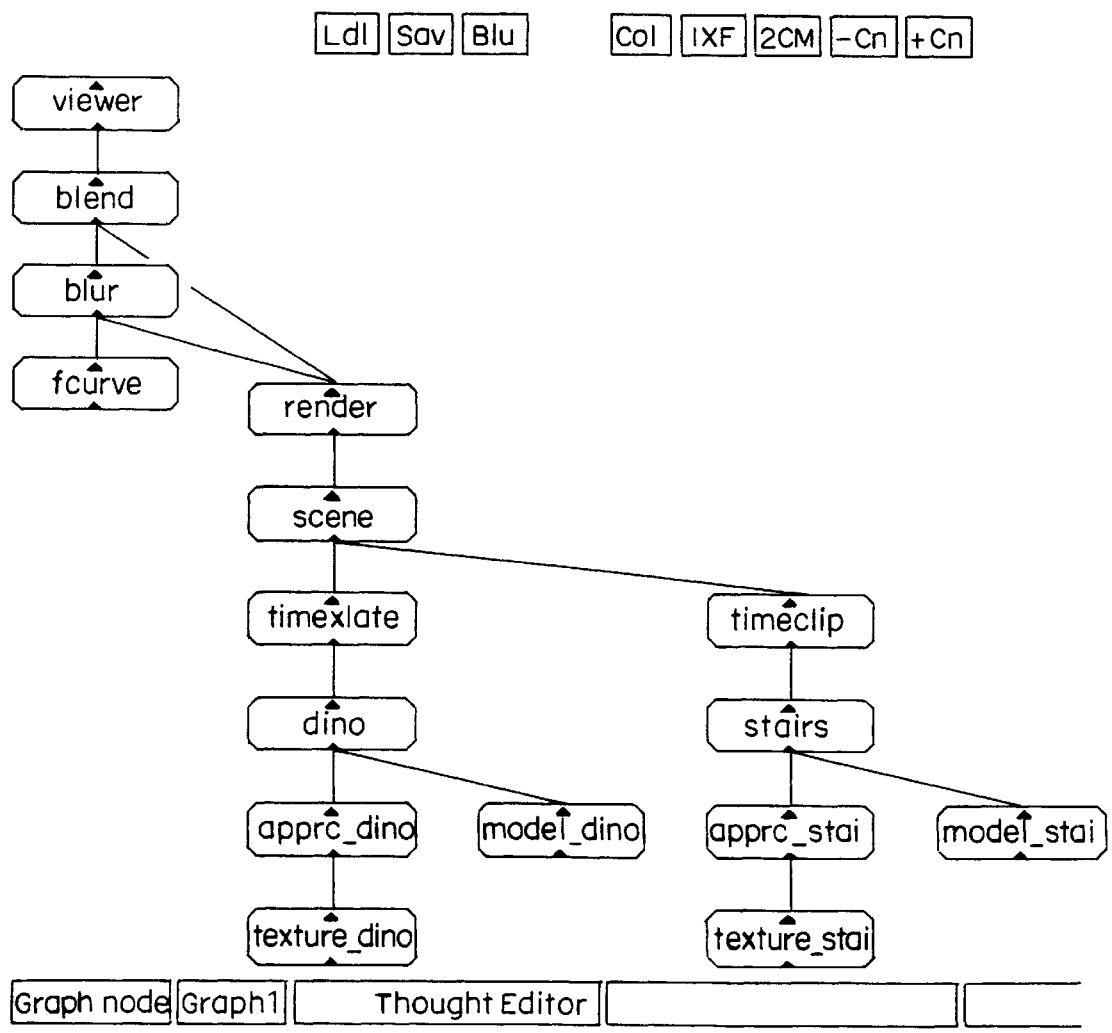
FIG. 12 is a representation of a sample user interface for the scene graph.
Figure 13:
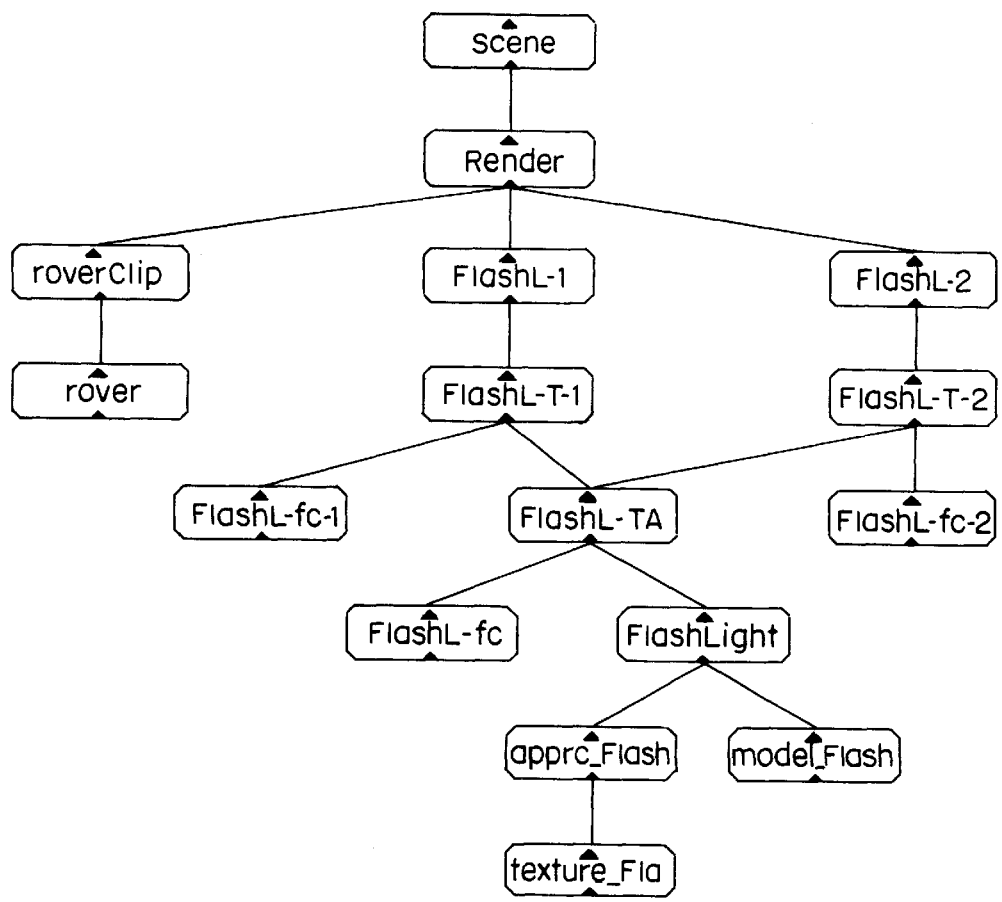
FIG. 13 is a representation of a user interface for another scene graph.
Figure 14:
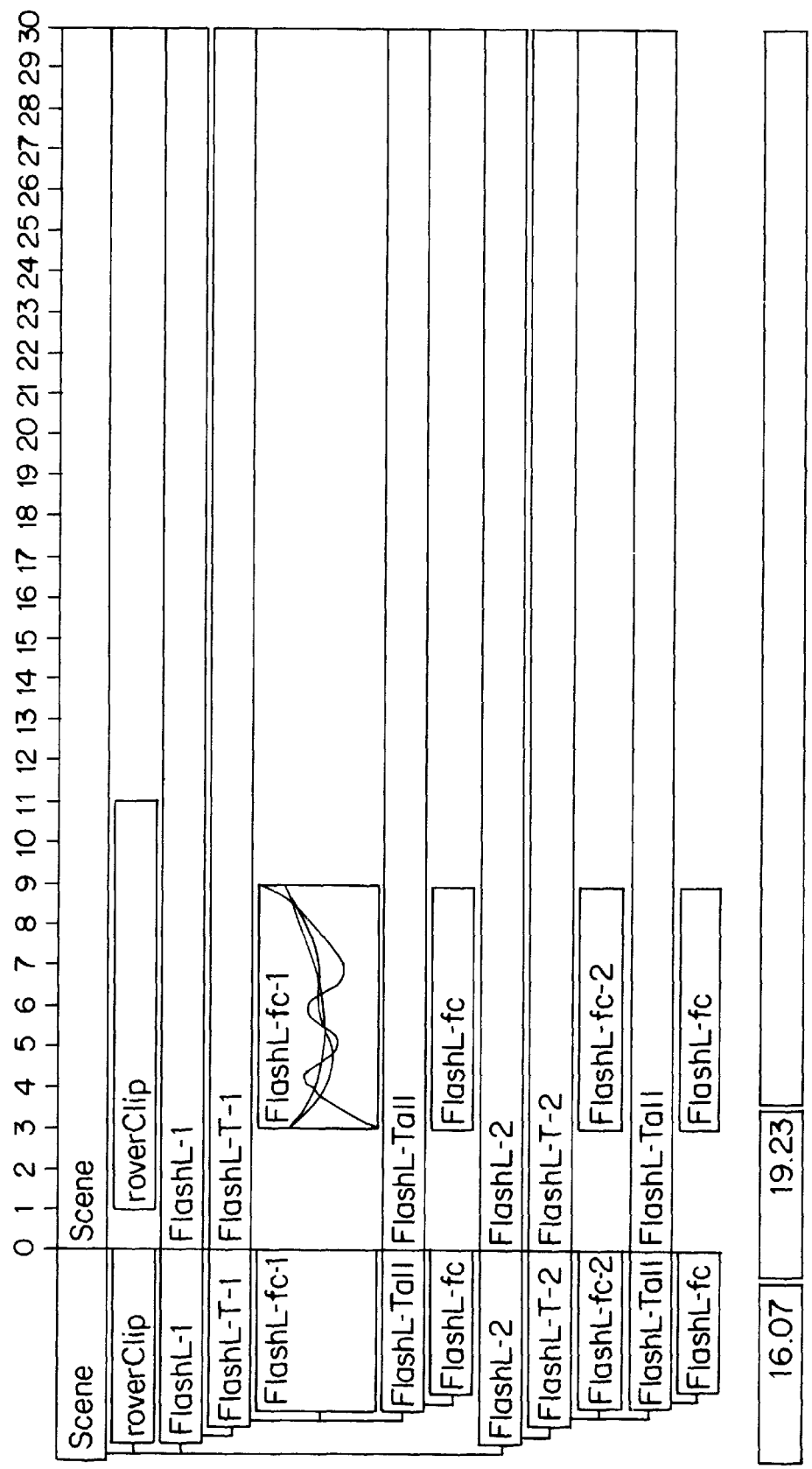
FIG. 14 is a representation of a sample user interface for a timeline view of scene graph nodes as tracks and their time transforms and time extents as time intervals on these tracks.

The scene graph can be presented and/or manipulated in a user interface as a schematic diagram, such as shown in FIGS. 12 and 13. Time transforms and time extents can also be presented and/or manipulated in a user interface as tracks and time intervals in a time, such as shown in FIG. 14.

a. Temporal

The dependency graph is declarative for the state of the scene over all times within the duration of the scene. There are no connectivity changes within the graph 40 dependent on the scene time. The topology of the graph 40 can be modified by the user, but remains fixed during media processing and playback. Any time-dependent changes in behavior must be expressed as a parameterized temporal operator within the graph, not external to it.

The fundamental traversal of the graph is to generate a view of the scene at a specific time. The current global scene time is written to a temporal context, which is attached to the traversal context, triggering a traversal. The nodes are traversed from a time source root, and the current time is processed by temporal operators. The temporal operators convert a global scene time to a (nested) local time for subsequent consumption by local media generation nodes. Time is treated as a continuous 1D coordinate. There are also time transforms, such as translate and scale, clipping and synchronization operators 50. Specific temporal operators 50 are described in a following section.

Other traversals have an extended time interval within the traversal context. For example, an inquiry for the whole sequence, or a playback caching traversal. Other information in the temporal context includes time scale (to affect frequencies, velocities and other time differentials), and frame rate, which affects the number of frames constructed for flipbook caches.

Figure 7A:
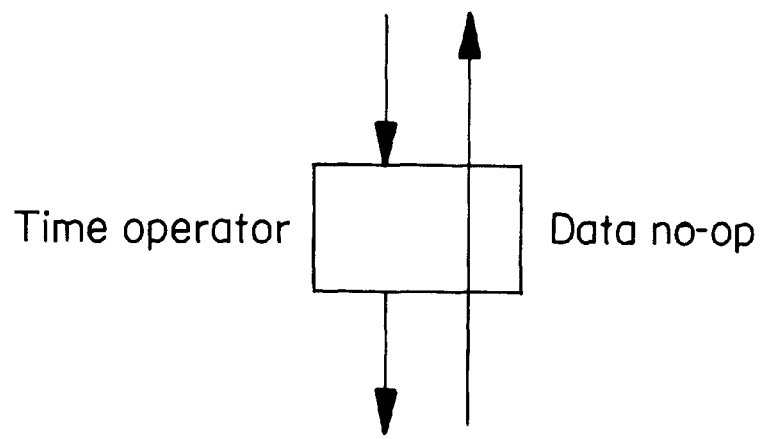
FIG. 7A shows that temporal operators do not modify data in the reverse traversal.

Temporal operators do not modify data connected on the return pathway, as shown in FIG. 7A.

b. Data

Data operators modify data values (same type, changed content), extract data values (same type, reduce content), aggregate data (combine data into larger structures, preserve content), change data format (different type, more or less preserve content), or convert the information carried by the data to a different form (different type, different content).

Data operators include processors for all of the base types.

Time itself is a data type within the graph 40. For example, a time translation operator will take a continuous time valued parameter. This time parameter is not the same as a temporal traversal context (although the context will contain a current time value).

Figure 7B:
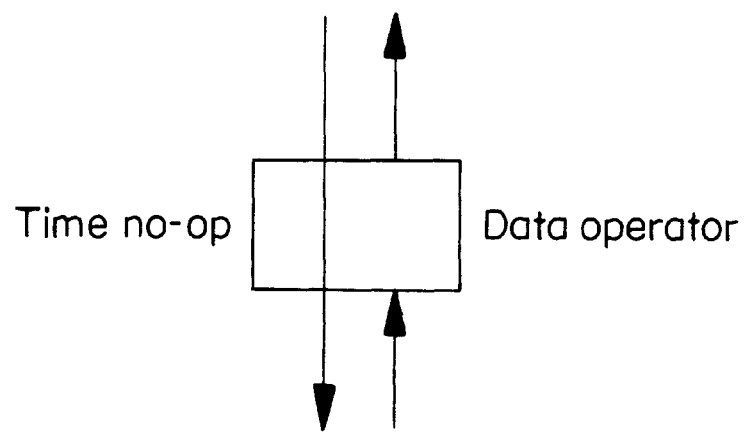
FIG. 7B is a time operator.

Some operators 50 are time invariant and do not modify the time context, as shown in FIG. 7B.

Figure 8A:
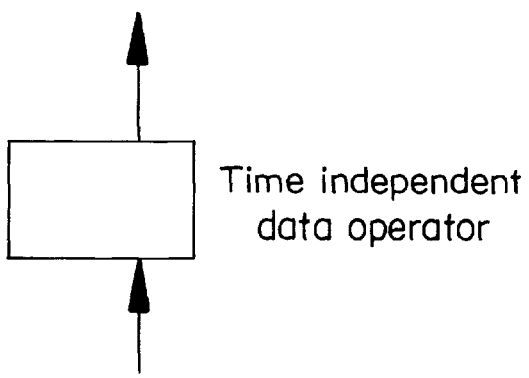
FIGS. 8A, 8B, and 8C illustrate a time independent operator, an iteration operator, and a time source/data sink operator, respectively.

Some data operators 50 such as shown in FIG. 8A, are time independent, that is, they operate on extended clips of data, rather than process data at one instant. Most such operators process one clip to make another clip, and this can be an iterative batch mode over a simple frame operation. There are other operators 50 which process a clip to extract a single piece of data.

An example would be a threshold data module used in a synchronization macro 51. The threshold module could take an audio clip and produce the time value at which the volume exceeded a certain value. The time value could then be fed to a time translation module to synchronize an animated object to the start of a sound. There are problems when the data source is time dependent (procedural), or multiple dependencies create cycles, which would need special scheduling or solving.

Nodes which produce a time data value, or time extent value, are called data analysis nodes.

Figure 8B:
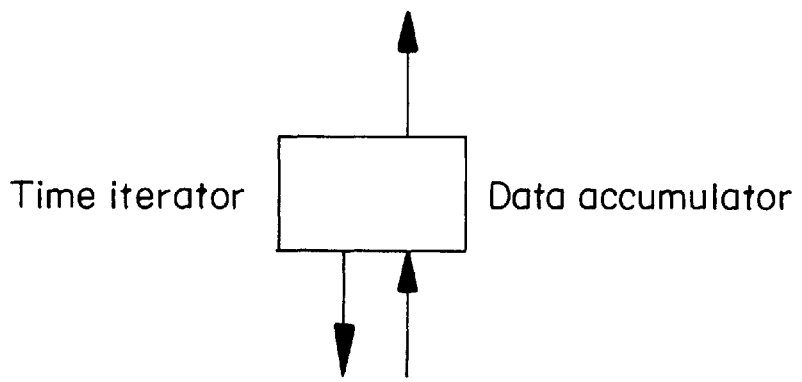

Data can be converted from time varying, to time independent (extended over time) by an accumulator operator as shown in FIG. 8B. The primary use of these operators 50 is to accumulate caches for playback. It is likely that the accumulation of data is a mode on some subset of the media, grouping and render nodes. If the data sequence is static, then the accumulated data is just a pointer to the original data set. If the data really is procedural, then the accumulation must happen explicitly and new data is stored.

c. Sources and Sinks

Figure 8C:
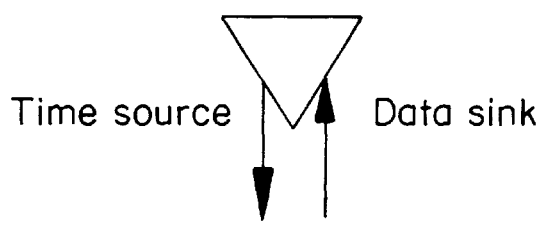

Time sources as shown in FIG. 8C originate traversals and consume data for display. Examples include data savers and viewers, such as an interactive preview window 39. Each of the principal data types has a loader and saver.

Figure 9A:
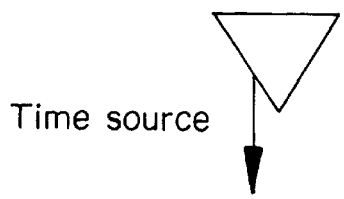
FIGS. 9A, 9B, and 9C illustrate a time source operator, a data sink operator, and a combined time sink/data source operator such as implemented at a leaf node.

Some time sources do not consume data, these are called timers as shown in FIG. 9A. There should be a data consumer in the graph 40 to receive the results triggered by the timer. Timers are asynchronous event generators, and require special scheduling. There should only be one timer in a graph, since multiple asynchronous inputs are likely to produce badly ordered and confusing output. Timers are likely to be low-level components within Viewers, rather than stand-alone operators.

Figure 9B:
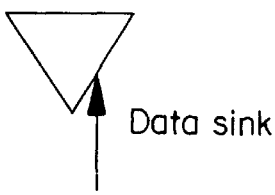

Passive data sinks shown in FIG. 9B do not initiate traversals, they simply trigger a data output task when their input changes. Most data writers, or savers, are passive.

Most Viewers are active. Each active time source registers itself with the graph manager when it is connected to the graph 40.

Figure 9C:
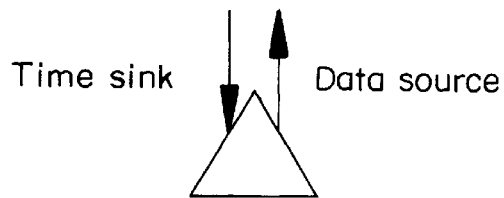

Data sources are the leaf nodes 48 of the graph 40. Traditionally they generate data without any lower level traversal, and there is no distinction between pre- and post-order functions. In an event model, they listen for time context events and emit data changed events, as in FIG. 9C.

Figure 9D:
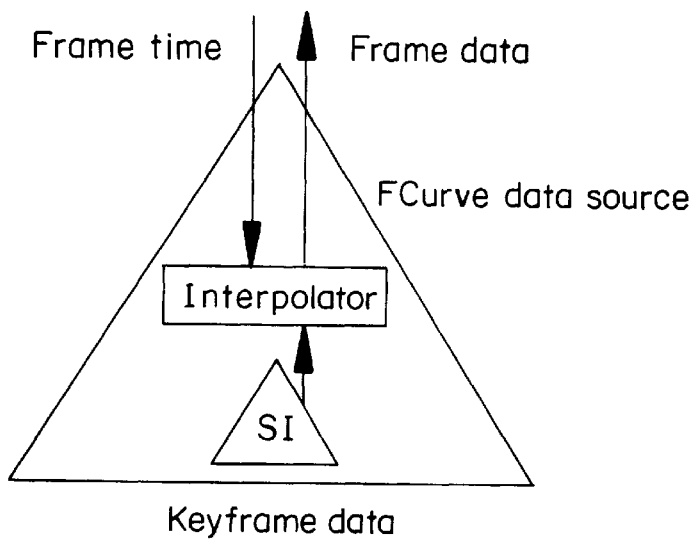
FIG. 9D illustrates a simple function curve operator.

For example, a simple function curve (or FCurve) might look like FIG. 9D.

Figure 10A:
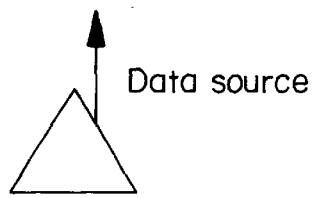
FIG. 10A is a simple data source implemented at a leaf node.

Data sources shown in FIG. 10A, can be time independent, either because their value is a constant value, or because it contains all the time variation.

Figure 10B:
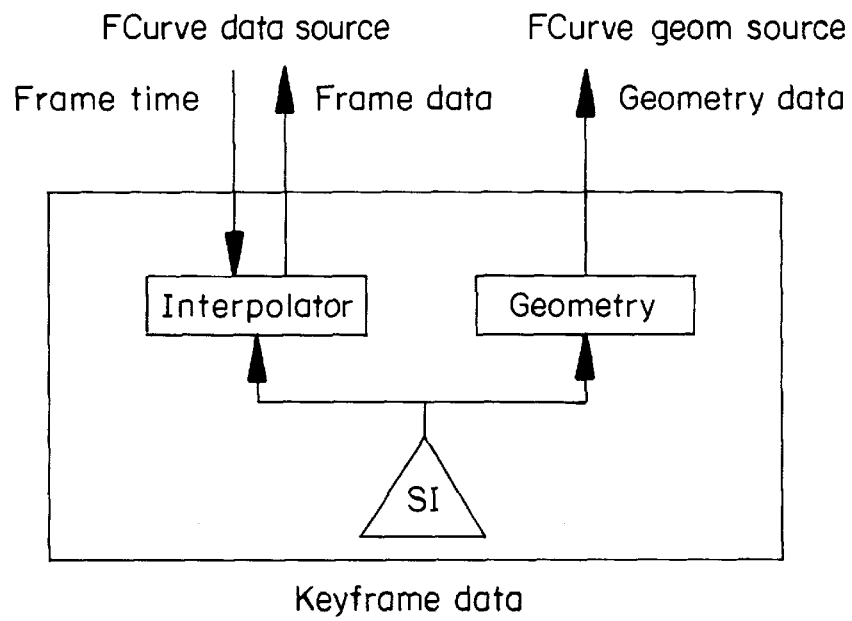
FIG. 10B illustrates how a function curve for a path may be implemented.

For example, a function curve for a path may want to output the whole path geometry, independent from any current scene time; as shown in FIG. 10B

Figure 10C:
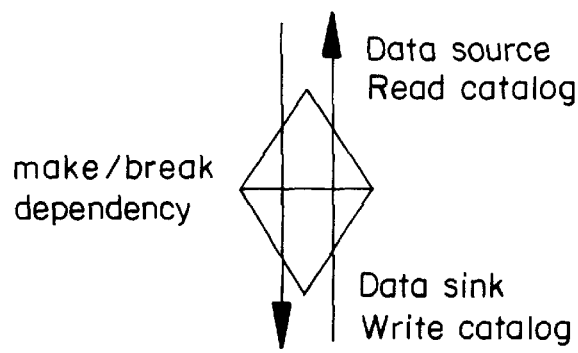
FIG. 10C is a sub-graph boundary node.

When a graph 40 becomes very large, or a project is being worked on by several people, it will be natural to partition the task into several sub-graphs. These can be distinct graphs, with separate sources and sinks, but that would break the dependency between the sub-graphs. As shown in FIG. 10C, it is useful to have a sub-graph boundary node which acts like a persistent save/restore operator for a single named object in the Catalog, but which can pass dependencies when required, during a single runtime session. When a Viewer is attached to one sub-graph within a large graph, data-changed events usually propagate throughout the graph, even if data is only recalculated for the operators actually traversed from the Viewer. The graph partition node could stop event propagation across the sub-graph boundary.

If events are propagated, and traversal enabled, then the partition node does not modify any traversal contexts or data values.

d. Real-time Feeds

Figure 11:
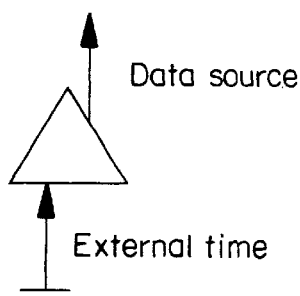
FIG. 11 is a representation of a time source such as a real time data feed.

Real-time feeds are asynchronous event generators, which inject new data into the graph without an internal time context change. Examples include data from real-time data capture, and conventional user interfaces (e.g. position locator). In general they require special scheduling, but in practice, realtime feeds can usually be accommodated by broadcasting the data changed event to relevant time sources (viewers, savers), and allowing them to make a decision about when or how to start a new output traversal. The time sources, shown in FIG. 11, have to construct a new temporal context, and apply a policy for dropping data from the feed when refreshing the output cannot keep pace with the data feed.

When the external triggering is not related to internal scene time, then it is easy for the time sources to repeat their current time context. So a new output is generated for the same scene time, but with new data in one of the leaf nodes. This is the case for most user interface interactions which do not involve the time line.

e. Macros and Scripts

Operators can be grouped into macro operators. Input and output ports can be exported across the macro boundary through explicit macro links. Other internal ports are inaccessible and the data is encapsulated. Parameters for the macro are explicitly chosen from the parameters available on the enclosed operators. It is preferred that a library of common macros is provided with the system, some of these may be compiled ("cooked") into individual non-editable system objects, and some of those may represent hardware-accelerated pipelines.

Script nodes are lightweight control operators, which can coordinate parameters within a macro. Scripts manipulate simple parameter types, with a single update function. Scripts are useful for replacing tedious networks of arithmetic operators with a general scripting or programming language. Macro and Script are independent. Macro implements containment and data encapsulation. Scripts implement behavior without sub-classing existing operators. There can be multiple Scripts per Macro. Script code can be inlined within an ASCII format, and have the system extract the function body and link it into the runtime system.

6. Operators a. Time Ops

The basic structural operator is TemporalGroup, which contains references to an arbitrary set of temporal children. When a temporal operator is invoked during traversal, it may modify the temporal traversal context, then traverse some or all of its children connections with the new local time.

Temporal (contains a TemporalExtent)
    TimeGroup (contains a list of Temporals)
        TimeTranslate
        TimeScale (with centre, defaults to local time origin)
        TimeWarp (generalized functional mapping, TCurve)
        TimeClip
        TimeTransform (combines translate, center, scale and clip)
        TimeLoop (modulus function)
        TimeSwitch
            TimeFlipbook (one discrete child per frame)
            TimeSequence (concatenate children by time translation)

Data analysis operators take extended clips of data and return time information (a single time or perhaps a time interval), which can be used as parameters for temporal operators. For example:
- ThresholdAudio
- ThresholdFCurve
- PathProximity (curve intersection)
- ObjectProximity (surface collision)

Macro Operators
- Synch { contains time translation and data analysis operator }
- SynchAudio, SynchFCurve, SynchCollision, etc.

World time coordinates are defined by the complete shot, and a global time extent is part of the Scene node. The time context for a traversal has a clip state, which is initialized from the shot extent. All elements of the scene are clipped to the shot extent. Time clip boxes accumulate (intersect) down the hierarchy as additional time clip operators are encountered during traversal. Clip state is pushed and popped on entering and leaving sub-graphs.

Each temporal node has a time extent which is the union of its extent, with the extents of its children. Time extents propagate up the hierarchy (for temporal culling and inquiries) as function curves, media loaders, or time operators are connected or changed. Similarly, raw and transformed frame-rates propagate from frame-based media loaders. Time extent is public information, and it can always be accessed through an output port on the operator.

Time culling truncates traversal on the basis of current clip state and local extents.

Media loader nodes are usually bound with a local time transform, but this macro composition can be implicit or explicit.

What is claimed is:

1. A method of specifying a choreographed media production as a graph of nodes and acyclic directed paths defining related sets of forward and reverse traversals comprising the steps of:
   (b) adding to the graph a leaf node with a data-generation function that generates in a reverse traversal data related to the choreographed media production based on a temporal context;
   (c) adding to the graph an intermediate node with a temporal transform that takes a temporal context as an input and derives a new temporal context as the output, during a forward traversal, and then restores the forward traversal's input temporal context during the corresponding reverse traversal; and
   (d) connecting the intermediate node into the graph with a directed path that defines both a forward traversal that carries a temporal context from the root node through the intermediate node to the leaf node and a symmetric reverse traversal that begins when the forward traversal is completed and ends at the root node;
wherein the root node defines both a spatial context and temporal context, the intermediate node includes the ability to apply a spatial transform during forward traversal and reverse this spatial transform during reverse traversal, and the leaf node bases its data-generation function on both the spatial context and temporal context.

2. A method as in claim 1 in which a traversal generates a sequence of pixel regions based on the time context.

3. A method as in claim 1 in which a traversal generates a sequence of pixel regions ans synchronized audio track based on the time context.

4. A method as in claim 1 in which the intermediate node also in the reverse traversal generates data related to the choreographed media production before restoring the forward traversal's input temporal context.

5. A method as in claim 1 in which the spatial context is a two-dimensional context.

6. A method as in claim 1 in which the spatial context is a three-dimensional context.

7. A method as in claim 1 in which a segment of the graph represents a rendering process with a spatial transform that transforms a three-dimensional spatial context into a two-dimensional spatial context based on parameters for generating an image frame from a three-dimensional scene.

8. A method as in claim 1 in which a segment of the graph represents an image analysis process with a spatial transform that transforms a two-dimensional spatial context into a three-dimensional spatial context, based on parameters from the analysis of at least two image framed to recover three dimensional data from the visual scene represented by the images frames.

9. A method as in claim 1 in which a plurality of root nodes, a plurality of intermediate nodes and a plurality of leaf nodes are present in the graph and connected with acyclic directed paths, each directed path starting at one of the plurality of root nodes.

10. A method as in claim 1 in which a temporal transform within an intermediate node can terminate the forward traversal and initiate the reverse traversal based on transforming one of the parameters of the input time context to a null value.

11. A method as in claim 1 wherein the temporal transform within an intermediate node specifies a time scale for the input time context.

12. A method as in claim 1 wherein a set of operations and related connections contained in a portion of the graph is collapsed and represented as a single node with associated connections.

13. A method as in claim 1 wherein the data-generation function specifies how operations may be pipelined.

14. A method as in claim 1 wherein an advance traversal of multiple nodes provides parameters for set-up functions performed by nodes during this advance traversa.

15. A method as in claim 1 in which the graph structure is presented in a user interface as a schematic diagram with nodes represented as shapes and the paths connecting nodes represented as lines or arcs.

16. A method as in claim 1 in which a node is presented in a user interface as a track in a time line, an the result of applying the node's time transform to a time context is presented as a time interval displayed with the associated track.

17. A method as in claim 16 in which user manipulation of the time interval alters at least one parameter of the time transform.

18. A method as in claim 1 wherein a forward traversal carries within the temporal context a constraint parameter that specifies modifications to processing performed during the reversal traversal.

19. A method as in claim 18 wherein the constraint is selected from the group consisting of image quality, sound quality, level of detail, processing time, and render functions.

* * * * *